(12) United States Patent
Mizutani et al.

(10) Patent No.: US 7,562,006 B2
(45) Date of Patent: Jul. 14, 2009

(54) DIALOG SUPPORTING DEVICE

(75) Inventors: Kenji Mizutani, Nara (JP); Yoshiyuki Okimoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 27 days.

(21) Appl. No.: 11/785,368

(22) Filed: Apr. 17, 2007

(65) Prior Publication Data

US 2007/0244687 A1    Oct. 18, 2007

Related U.S. Application Data

(63) Continuation of application No. PCT/JP2006/311786, filed on Jun. 13, 2006.

(30) Foreign Application Priority Data

Jul. 6, 2005    (JP) .............................. 2005-197923

(51) Int. Cl.
    *G06F 17/28*    (2006.01)
(52) U.S. Cl. ................ 704/5; 704/4; 704/7; 704/8
(58) Field of Classification Search ................ None
    See application file for complete search history.

(56) References Cited

U.S. PATENT DOCUMENTS

| | | | |
|---|---|---|---|
| 6,523,000 B1 * | 2/2003 | Ando et al. ............ | 704/2 |
| 6,535,842 B1 * | 3/2003 | Roche et al. ............ | 704/7 |
| 2002/0120436 A1 | 8/2002 | Mizutani et al. | |
| 2004/0002848 A1 * | 1/2004 | Zhou et al. ............ | 704/2 |
| 2005/0131673 A1 * | 6/2005 | Koizumi et al. .......... | 704/2 |
| 2005/0149316 A1 * | 7/2005 | Ushioda et al. ......... | 704/2 |
| 2006/0004560 A1 * | 1/2006 | Whitelock ............. | 704/2 |

FOREIGN PATENT DOCUMENTS

| | | |
|---|---|---|
| JP | 2000-242642 | 9/2000 |
| JP | 2003-030187 | 1/2003 |
| JP | 2003-288339 | 10/2003 |
| JP | 2005-107597 | 4/2005 |
| WO | 00/49523 | 8/2000 |

* cited by examiner

*Primary Examiner*—Richemond Dorvil
*Assistant Examiner*—Leonard Saint Cyr
(74) *Attorney, Agent, or Firm*—Wenderoth, Lind & Ponack, L.L.P.

(57) ABSTRACT

A dialog supporting device supporting improved dialog by reducing the number of utterances resulting from misunderstandings and hasty conclusions. The dialog supporting device includes: an example database which holds examples used in the dialog; an utterance receiving unit which receives utterances of a user and outputs the utterances as utterance information; an example selecting unit which sequentially selects examples most similar to the utterance information from the example database, and obtains translated examples corresponding to the examples; an utterance difference calculating unit which calculates a difference between the utterance information and the example selected by said example selecting unit and obtains difference information representing the difference; a sending unit which sends, to a dialog supporting device of a dialog partner, the example obtained by the example selecting unit and the difference information; a receiving unit operable to receive the example and the difference information from the dialog supporting device of the dialog partner; and an utterance outputting unit operable to output the example and the difference information received by the receiving unit.

15 Claims, 36 Drawing Sheets

FIG. 2

| Utterance No. | Language 1 | Language 2 |
|---|---|---|
| 1 | いらっしゃいませ。 | May I help you? |
| 2 | チェックインをお願いします。 | Check-in, please. |
| 3 | 予約はされていますか。 | Have you made reservation? |
| 4 | はい。 | Yes. |
| 5 | 喫煙の部屋でよろしいでしょうか。 | Do you prefer smoking room? |
| 6 | 禁煙でおねがいします。 | Non-smoking room, please. |
| 7 | かしこまりました。 | Certainly. |
| 8 | このカードに記入して下さい。 | Please fill in the form. |
| 9 | いいえ。 | No. |
| 10 | ありがとうございます。 | Thank you. |
| 11 | パスポートを見せて下さい。 | Please show me your passport. |
| 12 | クレジットカードを確認させてください。 | Please let me confirm your credit card. |
| 13 | クレジットカードで支払えますか? | May I pay by credit card? |
| 14 | タクシーを呼んでください。 | Please call me taxi. |
| 15 | ホテルの電話番号を教えて下さい。 | Please tell me telephone number of this hotel. |
| 16 | 空港へ行きたい。 | I wan to go to the airport. |
| 17 | 電車は何時に出発しますか。 | When does the train leave? |
| 18 | 8時です。 | Eight o'clock. |
| 19 | 電話番号は222-2222です。 | The telephone number is 222-2222. |
| 20 | 空港へ行く方法を教えて下さい。 | Please tell me how to go to the airport. |
| ... | ... | ... |

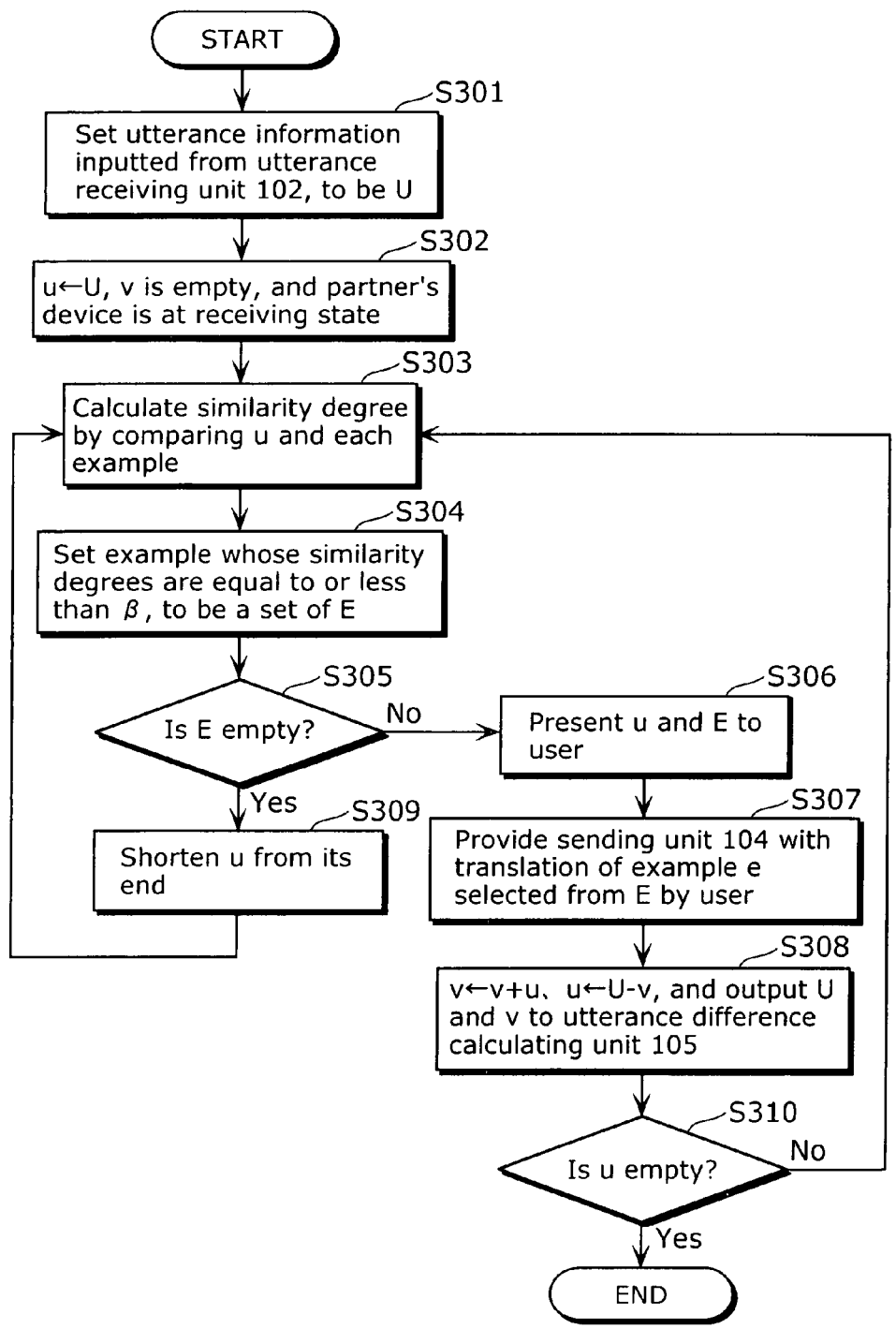

FIG. 17

| Conversion Rule No. | Range of Difference Information | Language Expression |
|---|---|---|
| 1 | 0.75~1 | 「まだ言いたいことがあります」<br>"I still have something to say." |
| 2 | 0.5~0.75 | 「ちょっと待って下さい」<br>"Wait for a while." |
| 3 | 0.25~0.5 | 「もう少し待って下さい」<br>"Wait a minute." |
| 4 | 0~0.25 | 「あと少しだけ待って下さい」<br>"Please wait just a minute!" |

FIG. 21

| Utterance No. | Language 1 | Language 2 |
|---|---|---|
| 1 | 欢迎光临 | May I help you? |
| 2 | 我要登记 | Check-in, please. |
| 3 | 预约了吗? | Have you made reservation? |
| 4 | 是 | Yes. |
| 5 | 可以吸烟的房间，好吗? | Do you prefer smoking room? |
| 6 | 希望禁烟的 | Non-smoking room, please. |
| 7 | 知道了 | Certainly. |
| 8 | 请在这个卡上写 | Please fill in the form. |
| 9 | 不 | No. |
| 10 | 谢谢 | Thank you. |
| 11 | 请给我看护照 | Please show me your passport. |
| 12 | 请给我看信用卡 | Please let me confirm your credit card. |
| 13 | 能用信用卡支付吗? | May I pay by credit card? |
| 14 | 请叫来出租车 | Please call me taxi. |
| 15 | 请教我一下宾馆的电话号码 | Please tell me telephone number of this hotel. |
| 16 | 想去机场 | I wan to go to the airport. |
| 17 | 电车几点钟出发 | When does the train leave? |
| 18 | 是8点 | Eight o'clock. |
| 19 | 电话号码是222-2222 | The telephone number is 222-2222. |
| 20 | 请教我一下去机场怎么走 | Please tell me how to go to the airport. |
| ... | ... | ... |

FIG. 32

| Conversion Rule No. | Range of Difference Information | Language Expression |
|---|---|---|
| 1 | 0.75~1 | "我还有话要说。"<br>"I still have something to say." |
| 2 | 0.5~0.75 | "请稍等。"<br>"Wait for a while." |
| 3 | 0.25~0.5 | "请再稍等。"<br>"Wait a minute." |
| 4 | 0~0.25 | "请再稍等片刻。"<br>"Please wait just a minute!" |

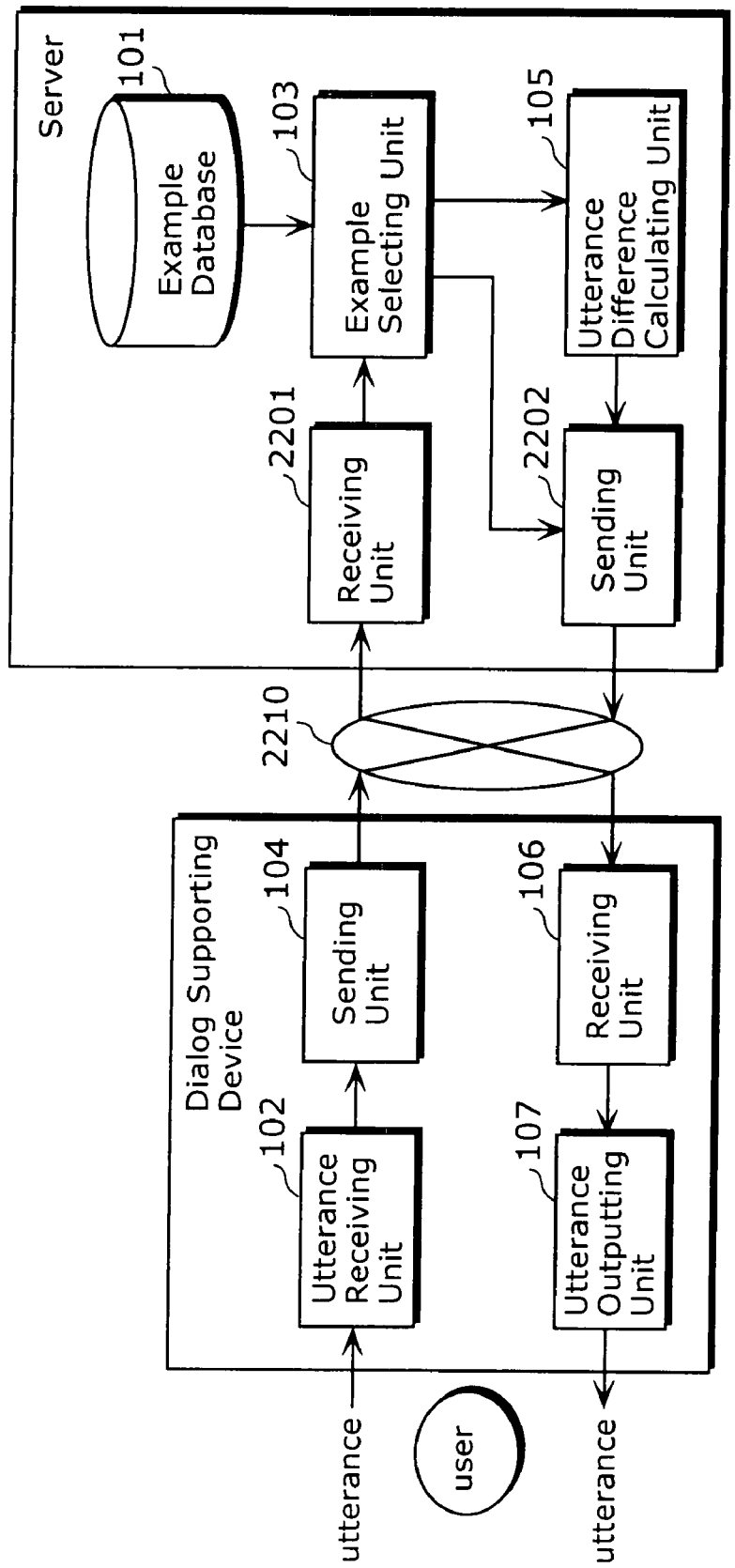

DIALOG SUPPORTING DEVICE

CROSS REFERENCE TO RELATED APPLICATION(S)

This is a continuation application of PCT application No. PCT/JP2006/311786 filed Jun. 13, 2006, designating the United States of America.

BACKGROUND OF THE INVENTION

1. Field of the Invention

The present invention relates to a dialog supporting device which supports an on-going dialog made between people.

2. Description of the Related Art

Conventionally, translation devices have been developed with the purpose of supporting on-going dialog in different languages, which is made between ordinary people and local people on trips abroad or the like. Such a translation device is represented by certain translation devices, by which a translation scheme using original/translation pairs of example sentences or example usages is implemented in small information processing apparatuses such as Personal Digital Assistants (PDAs). Such devices have thousands of examples in order to cover general travel conversation. However, the devices have a problem in usability when a user actually uses the device, since the user has to select a desired example from a list of the examples by sight. This problem is noticeable, especially when such a device has a small display for displaying the list of examples, which makes it difficult for the user to view many examples at once. Moreover, in general use of the translation device, one dialog with a dialog partner requires more than several examples, so that the translation device completes the dialog taking much more time than the user expects. Therefore, in order to achieve the final purpose of supporting dialog between people, there is a need for a function by which the user can speedily select the desired example from a great number of examples.

As a method for solving the above problem, there has been proposed a technique of narrowing down candidates for a next utterance of a user, using example dialog models or a corpus of conversation training histories, as disclosed in Japanese Unexamined Patent Application Publication No. 2003-30187, for instance.

SUMMARY OF THE INVENTION

When such a translation device is actually used, two users who speak respective different languages have dialog using respective translation devices alternately. When the translation device has an example expressing exactly what one user wishes to say to the other user (hereinafter, referred to also as "a partner", "a dialog partner", or "a partner user"), the former user simply selects the example. However, each of the examples in the translation device is generally a short sentence in order to be applied to various dialog situations. The reason for a short sentence as mentioned above is that a long example expresses rather specific situations and thereby applications of the sentence are considerably limited. Therefore, the user has to express what to say, by sequentially selecting a plurality of such short examples.

However, although it is possible to shorten a time required to select examples using, for instance, the technique disclosed in the above-mentioned Japanese Unexamined Patent Application Publication No. 2003-30187 or the like, it is not possible to completely eliminate a time lag between selection of a certain example and selection of a next example. Therefore, in the actual use, there is a problem that the time required to complete dialog is eventually increased, due to increase of utterances caused by misunderstandings and hasty conclusions, which will be explained in detail below.

For instance, in the case where a user A who speaks Japanese has dialog with a user B who speaks English and the user A wishes to say to the user B, "What time does a train bound for an airport leave?", only the following examples are related to what the user wishes to say in the translation device.

<Example 1> "空港へ行きたい。" "I want to go to the airport."
<Example 2> "電車は何時に出ますか。" "What time does the train leave?"

In this situation, the user A firstly selects "空港へ行きたい。" and then selects "電車は何時に出ますか。". Here, the user B hears the example 1 "I want to go to the airport." outputted from the translation device, and then, after a certain time period, hears the example 2 "What time does the train leave?". Here, if the user B hears the example 1 and immediately concludes that the user A asks where the airport is, the user B searches for an example explaining a location of an airport and then gives the user A the searched examples. However, since the user A already knows where the airport is, the user A has to suspend the search for the example 2 in order to let the user B know that the user A knows the location of the airport, by searching for a further example. As explained above, even if a time required to search for instance sentences is able to be shortened, a time required to complete dialog becomes longer due to increase of utterances caused by misunderstandings and hasty conclusions.

Thus, in a view of the above problems, an object of the present invention is to provide a dialog supporting device which can support dialog to be speedily completed, by reducing the number of utterances caused by misunderstandings and hasty conclusions.

In order to achieve the above object, a dialog supporting device according to the present invention supports dialog. The device includes: an example database operable to hold first examples and second examples which are used in the dialog, the respective first examples being associated with the respective second examples; an utterance receiving unit operable to receive an utterance of a user; an example selecting unit operable to (i) select a first example by searching the example database based on the utterance received by the utterance receiving unit, and (ii) obtain a second example associated with the selected first example; an utterance difference calculating unit operable to (i) calculate a difference between the utterance and the first example selected by the example selecting unit, and (ii) obtain difference information representing the calculated difference; and a sending unit operable to send the second example obtained by the example selecting unit and the difference information obtained by the utterance difference calculating unit, to a dialog supporting device of a dialog partner of the user.

According to the dialog supporting device of the present invention, by using the difference information, it is possible to notify a dialog partner of a user of when the user completes utterances. Therefore, interruption during the utterances is prevented, so that the dialog using the dialog supporting devices go on smoothly. In particular, it is possible to prevent situations where the user makes a too early reply to the partner from kindness and friendliness which unfortunately confuses the dialog eventually causing discomfort of both of the user and the partner after the dialog.

The disclosure of PCT application No. PCT/JP2006/311786 filed Jun. 13, 2006 and Japanese Patent Application No. 2005-197923 filed Jul. 6, 2005, including specifications, drawings and claims are incorporated herein by reference in its entirety.

BRIEF DESCRIPTION OF THE DRAWINGS

These and other objects, advantages and features of the present invention will become apparent from the following description thereof taken in conjunction with the accompanying drawings that illustrate specific embodiments of the invention. In the Drawings:

FIG. 2 is a table showing an example of an example database;

FIG. 3 is a flowchart showing processing performed by an example selecting unit;

FIG. 17 is a table showing an example of conversion rules used by an expression converting unit;

FIG. 21 is a table showing an example of an example database.

FIG. 32 is a table showing an example of conversion rules used by an expression converting unit;

FIG. 36 is a block diagram showing a structure of a dialog supporting device according to still another embodiment of the present invention.

DESCRIPTION OF THE INVENTION

Figure 1:
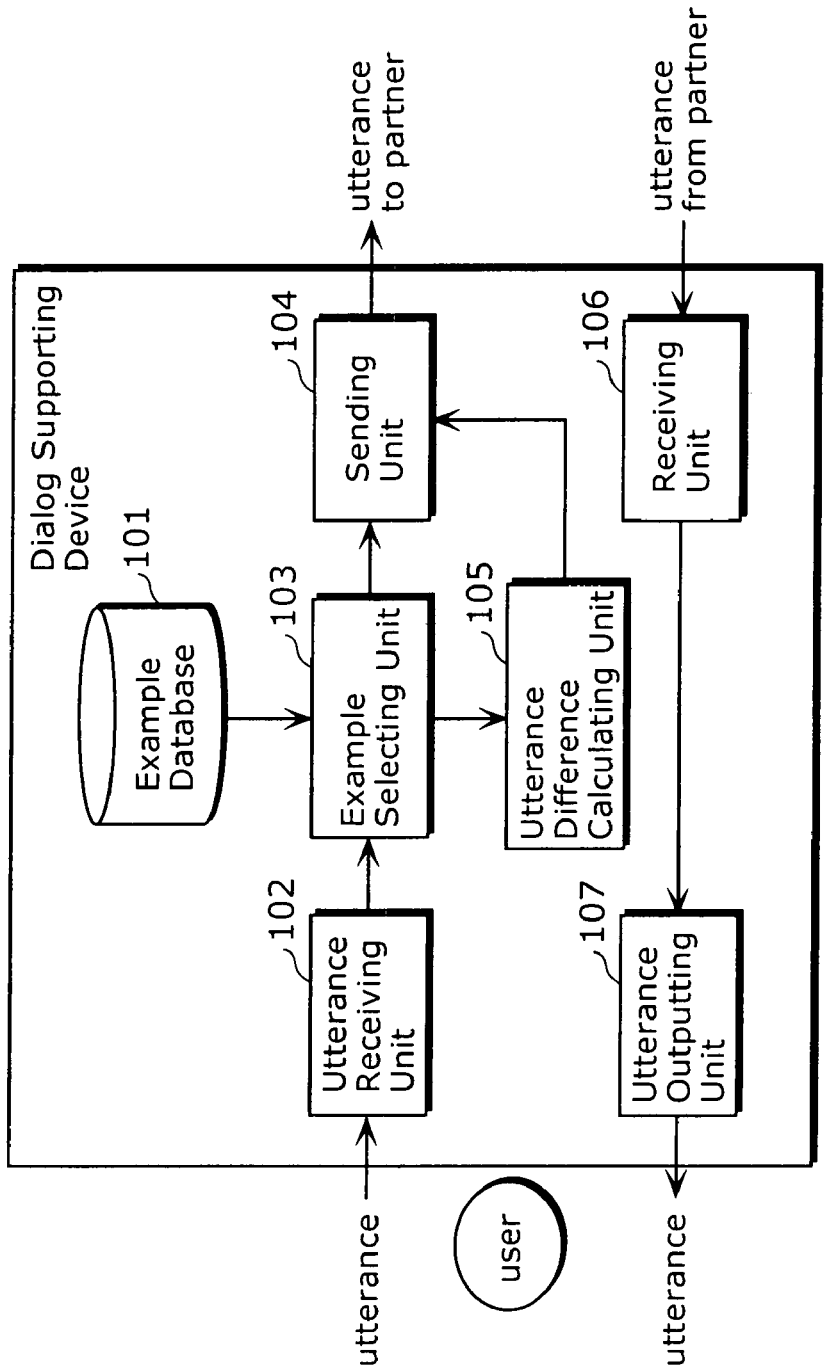
FIG. 1 is a block diagram showing a structure of a dialog supporting device according to the first embodiment of the present invention.

The dialog supporting device according to the present embodiments of the present invention supports dialog and includes: an example database operable to hold first examples and second examples which are used in the dialog, the respective first examples being associated with the respective second examples; an utterance receiving unit operable to receive an utterance of a user; an example selecting unit operable to (i) select a first example by searching the example database based on the utterance received by the utterance receiving unit, and (ii) obtain a second example associated with the selected first example; an utterance difference calculating unit operable to (i) calculate a difference between the utterance and the first example selected by the example selecting unit, and (ii) obtain difference information representing the calculated difference; and a sending unit operable to send the second example obtained by the example selecting unit and the difference information obtained by the utterance difference calculating unit, to a dialog supporting device of a dialog partner of the user.

Thereby, the user can notify a dialog partner of how much has already been told among what the user wishes to say (utterances received by the utterance receiving unit), so that it is possible to support the dialog to be speedily completed by reducing the number of utterances caused by misunderstandings and hasty conclusions.

Further, the example selecting unit may be further operable to select another first example related to the utterance, based on the difference between the utterance and the firstly-selected first example. Thereby, it is possible to sequentially gives the remaining part (rest) of what the user wishes to say to the partner, and also possible to notify the partner of the difference information at that time.

Furthermore, the example selecting unit may be operable to calculate a similarity which represents a degree of similarity between the utterance and the selected first example, using dynamic programming in a unit of any one of a character, a word, and a letter indicating pronunciation.

Still further, the utterance difference calculating unit may be operable to calculate the difference, by comparing the utterance and the first example selected by the example selecting unit in a unit of any one of a character, a word, and a letter indicating pronunciation.

Still further, the dialog supporting device may further include: a receiving unit operable to receive a second example and difference information sent from the dialog supporting device of the partner user; and an utterance outputting unit operable to output the second example and the difference information received by the receiving unit. Thereby, the user is able to know how much has already received among what the partner wishes to say to the user, so that the user can determine whether or not the received utterances should be replied. Thus, it is possible to support the dialog to be speedily completed by reducing the number of utterances caused by misunderstandings and hasty conclusions.

Still further, the utterance outputting unit may be operable to display the difference information received by the receiving unit, by a numeric character. Still further, the utterance outputting unit may be operable to display the difference information received by the receiving unit, by a figure. Thereby, it is possible for the user to immediately learn the difference information by sight, so that stress in waiting for a next utterance is reduced.

Still further, the utterance outputting unit may be operable to convert the difference information received by the receiving unit, into qualitative language expression, and output the resulting language expression. Still further, the utterance outputting unit may be operable to generate language expression corresponding to a filler based on the difference information received by the receiving unit, and output the resulting language expression. Thereby, it is possible to reduce stress of the user waiting for a partner's next utterance.

Still further, the dialog supporting device may further include: a candidate notifying unit operable to notify the user of candidates of the first example selected by the example selecting unit; and a selection instruction receiving unit operable to receive an instruction from the user to select one first example from the candidates of the first example, wherein the example selecting unit is operable to (i) extract candidates for a first example from the example database based on the utterance, and (ii) select one first example from the candidates according to the instruction received by the selection instruction receiving unit.

Still further, the utterance receiving unit is operable to receive the utterance (i) via continuous utterance recognition processing using a language model derived from the first example held in the example database, or (ii) via a keyboard under limitation by which only words included in the first examples held in the example database can be inputted.

Moreover, a dialog supporting system according to the present embodiments of the present invention includes a first dialog supporting device and a second dialog supporting device. The dialog supporting system supports dialog using the first and second dialog supporting devices. The first dialog supporting device includes: an example database operable to hold first examples and second examples which are used in the dialog, the respective first examples being associated with the respective second examples an utterance receiving unit operable to receive an utterance of a user; an example selecting unit operable to (i) select a first example by searching the example database based on the utterance received by the utterance receiving unit, and (ii) obtain a second example associated with the selected first example; an utterance difference calculating unit operable to (i) calculate a difference between the utterance and the first example selected by the example selecting unit, and (ii) obtain difference information representing the calculated difference; and a sending unit operable to send the second example obtained by the example selecting unit and the difference information obtained by the utterance difference calculating unit, to the second dialog supporting device. The second dialog supporting device includes: a receiving unit operable to receive the second example and the difference information sent from the first dialog supporting device; and an utterance outputting unit operable to output the second example and the difference information received by the receiving unit.

Moreover, a dialog supporting system according to the present embodiments of the present invention includes a first dialog supporting device, a second dialog supporting device, and a server connecting the first and second dialog supporting devices. The dialog supporting system supports dialog using the first and second dialog supporting devices. The first dialog supporting device includes: an utterance receiving unit operable to receive an utterance of a user; and a sending unit operable to send the utterance received by the utterance receiving unit to the server. The server includes: an example database operable to hold first examples and second examples which are used in the dialog, the respective first examples being associated with the respective second examples; an example selecting unit operable to (i) select a first example by searching the example database based on the utterance sent from the first dialog supporting device, and (ii) obtain a second example associated with the selected first example; an utterance difference calculating unit operable to (i) calculate a difference between the utterance and the first example selected by the example selecting unit, and (ii) obtain difference information representing the calculated difference; and a sending unit operable to send the second example obtained by the example selecting unit and the difference information obtained by the utterance difference calculating unit, to the second dialog supporting device. The second dialog supporting device includes: a receiving unit operable to receive the second example and the difference information from the server; and an utterance outputting unit operable to output the second example and the difference information received by the receiving unit.

Moreover, the present invention can be realized not only as the dialog supporting device, but also as: a dialog supporting method having steps performed by the units in the dialog supporting device; a computer program product which, when loaded into a computer, allows the computer to execute the steps; and the like. Furthermore, it is obvious that the program product can be distributed via a recording medium such as a CD-ROM or a transmitting medium such as the Internet.

The following describes preferred embodiments according to the present invention with reference to the drawings.

First Embodiment

FIG. 1 is a block diagram showing a structure of a dialog supporting device according to the first embodiment of the present invention.

The dialog supporting device according to the first embodiment is an device which supports dialog between people. The dialog supporting device has an example database 101, an utterance receiving unit 102, an example selecting unit 103, a sending unit 104, an utterance difference calculating unit 105, a receiving unit 106, and an utterance outputting unit 107.

Here, the utterance receiving unit 102 corresponds to the utterance receiving unit. The example selecting unit 103 corresponds to a set of the example selecting unit, the candidate notifying unit, and the selection instruction receiving unit. The utterance difference calculating unit 105 corresponds to the utterance difference calculating unit. The sending unit 104 corresponds to the sending unit. The receiving unit 106 corresponds to the receiving unit. The utterance outputting unit 107 corresponds to the utterance outputting unit.

The example database 101 holds examples used in dialog. The utterance receiving unit 102 receives an utterance of the user and converts the utterance into utterance information. From the example database 101, the example selecting unit 103 sequentially selects an example most similar to the utterance information, and provides a translation of the selected example. The utterance difference calculating unit 105 calculates a difference between (i) the utterance information and (ii) the example selected by the example selecting unit 103, and provides information regarding the difference (hereinafter, referred to as "difference information"). To a dialog supporting device of the partner user, the sending unit 104 sends the translated example provided from the example selecting unit 103 and the difference information. The receiving unit 106 receives a translated example and difference information outputted from the dialog supporting device of the partner user. The utterance outputting unit 107 outputs the received difference information and translated example to the partner user. Note that examples may is sent and received directly between the sending unit 104 of the user and the receiving unit 106 of the partner user or directly between the sending unit 104 of the partner user and the receiving unit 106 of the user, or indirectly via a server.

Next, a structure by which the above-structured dialog supporting device supports dialog in different languages is described in detail. It is assumed that the user is a native Japanese speaker, and the partner user is a native English speaker.

FIG. 2 is a table showing an example of examples held in the example database 101. Language 1 corresponding to the first examples is a native language of the user, while language 2 corresponding to the second examples is a native language of the partner user, and a pair of examples in languages 1 and 2 is a pair of an original sentence and a translated sentence shown side by side. For instance, when an example "空港へ行きたい" of utterance No. 16 in language 1 is selected by the example selecting unit 103, then an associated translated example "I want to go to the airport." in language 2 is outputted.

The utterance receiving unit 102 receives a user's utterance as character data using continuous utterance recognition processing or a keyboard, and provides the character data as utterance information to a next stage. Here, the utterance information is a character string corresponding to the user's utterance. When the utterance receiving unit 102 converts a user's utterance, using the continuous utterance recognition processing, accuracy of the utterance recognition is able to be increased by deriving language models from the examples held in the example database 101. On the other hand, when the utterance receiving unit 102 receives a user's utterance inputted by the keyboard, the characters are able to be efficiently inputted, by limiting input-able words to the words included in the examples in language 1 held in the example database 101.

FIG. 3 is a flowchart showing processing performed by the example selecting unit 103. According to the flowchart of FIG. 3, the example selecting unit 103 sequentially provides examples which are the most similar to the utterance information.

Figure 4:
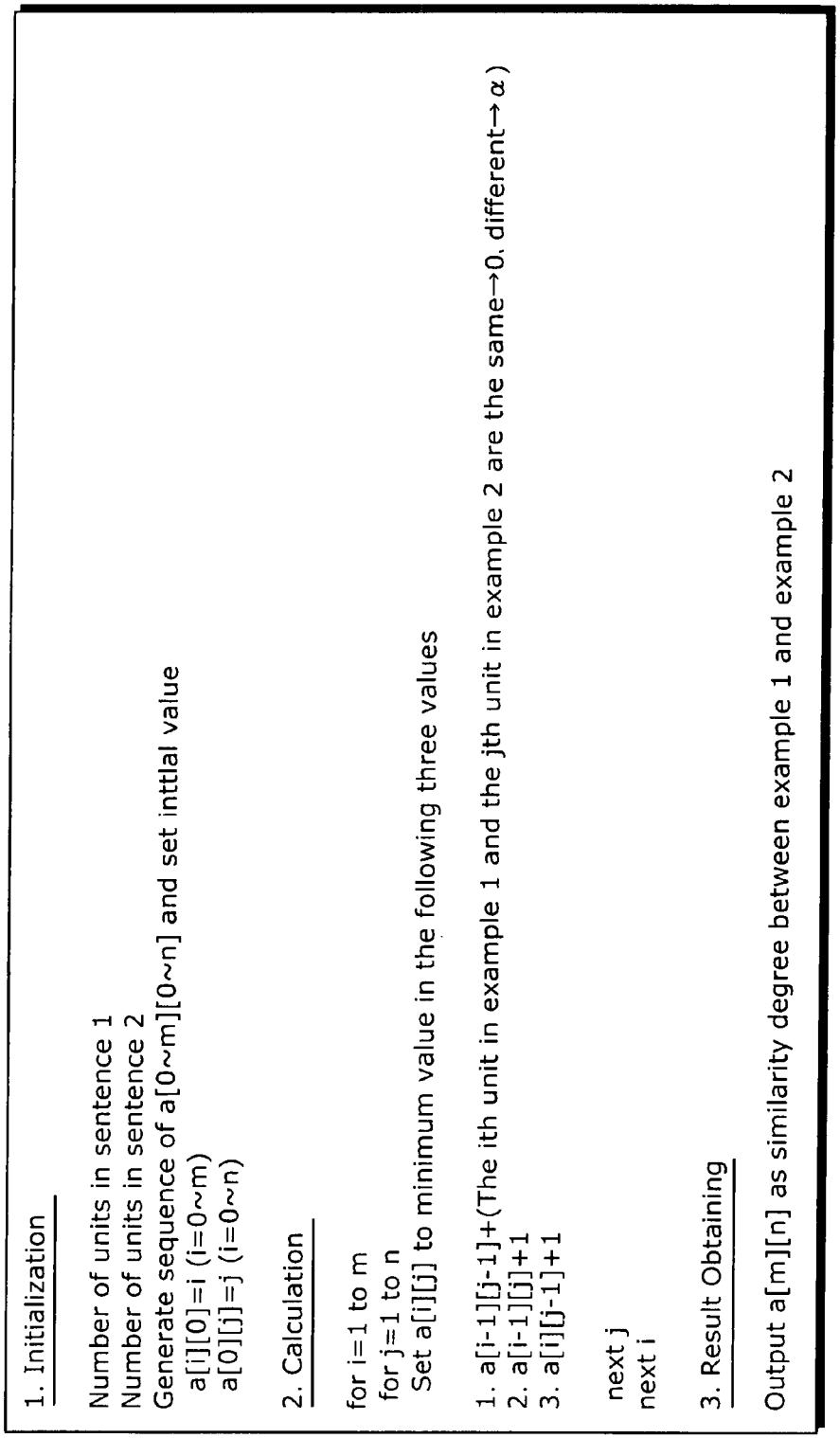
FIG. 4 is a diagram showing an example of dynamic programming used in similarity degree calculation performed by the example selecting unit.

Firstly, the example selecting unit 103 sets utterance information corresponding to an utterance inputted from the utterance receiving unit 102, to entire utterance information U (Step S301). Next, the entire utterance information U is set to partial utterance information (not-yet-translated remaining utterance information) u, and already-translated utterance information v is cleared to be empty. In addition, via the sending unit 104, a mode of the dialog supporting device of the partner user is changed to a receiving state (Step S302). The example selecting unit 103 calculates a degree of similarity (hereinafter, referred to as "a similarity degree") between the partial utterance information u and each of the examples in language 1 in the example database 101 (Step S303). Here, the example selecting unit 103 calculates, as the similarity degree, a distance between the partial utterance information u and each of the examples, using dynamic programming as shown in FIG. 4, for instance. In this case, a smaller distance value represents a higher similarity degree. In the dynamic programming of FIG. 4, a constitutional unit in a sentence is a character, a word, or a letter representing pronunciation, or a combination of them. For instance, in the case where the constitutional unit is a word (a=1), a similarity degree between a sentence 1={空港, ⌒, 行く} and a sentence 2={空港, まで, 行く} a[3][3]=1.

Next, from all examples in language 1, the example selecting unit 103 selects examples whose similarity degrees are equal to or less than a threshold value β, and sets the selected examples to example candidates E (Step S304). Note that the threshold value β is determined based on the number of examples held in the example database 101 and the number of examples whose expression are similar. Then, the example selecting unit 103 determines whether or not the example candidates E are empty (Step S305). As a result, if the example candidates E are not empty (No at Step S305), then the partial utterance information u and the example candidates E are presented to the user, so that the user selects a desired example from the example candidates E (Step S306). Then, after selecting an example e by the user, an example which is a translation of the example e is provided to the sending unit 104 (Step S307). Next, the example selecting unit 103 updates the partial utterance information u and the already-translated utterance information v as u←U−v and v←v+u, respectively, to be provided to the utterance difference calculating unit 105 (Step S308). Then, it is determined whether or not the partial utterance information u is empty (Step S310), and if the partial utterance information u is empty (Yes at Step S310), then the processing is ended, while if the partial utterance information u is not empty (No at Step S310), then the processing returns to the similarity degree calculation (Step S303).

On the other hand, if the determination (Step S305) is made that the example candidates E are empty (No at Step S305), the partial utterance information u is shortened from its end in order to select examples most similar to the partial utterance information u from the example database 101 (Step S309). Here, a unit of the shortening is a character, a word, or a clause. For instance, in the case of u="空港へ行く電車は何時発ですか", when the partial utterance information u is shortened on a clause basis, the partial utterance information u becomes "空港へ行く電車は" since the original u is {空港へ, 行く, 電車は, 何時発ですか}. Then, the processing returns again to the similarity degree calculation (Step S303) and repeats calculation of a similarity degree between the partial utterance information u and each of the examples in language 1 in the example database 101.

The utterance difference calculating unit 105 calculates difference information (U−v)/U based on the entire utterance information U and the already-translated utterance information v, and provides the resulting difference information to the sending unit 104. The difference information is calculated based on, for instance, the number of characters, the number of words, the number of letters representing pronunciation of the entire utterance information U and the already-translated utterance information v. Assuming the calculation is performed based on the number of characters, if the entire utterance information U="空港へ行く電車は何時発ですか" and the already-translated utterance information v="空港へ行く", the resulting difference information becomes (14−5)/14≈0.64.

To the dialog supporting device of the partner, the sending unit 104 sends translated examples in language 2 in the example database 101 sequentially provided from the example selecting unit 103. Here, each of the translated examples is added with each difference information provided from the utterance difference calculating unit 105. The sent information is received by the receiving unit 106 of the partner's dialog supporting device, and outputted to the partner via the utterance outputting unit 107. The utterance outputting unit 107 has a display device such as a liquid crystal display (LCD) or audio synthesis processing.

Figure 5:
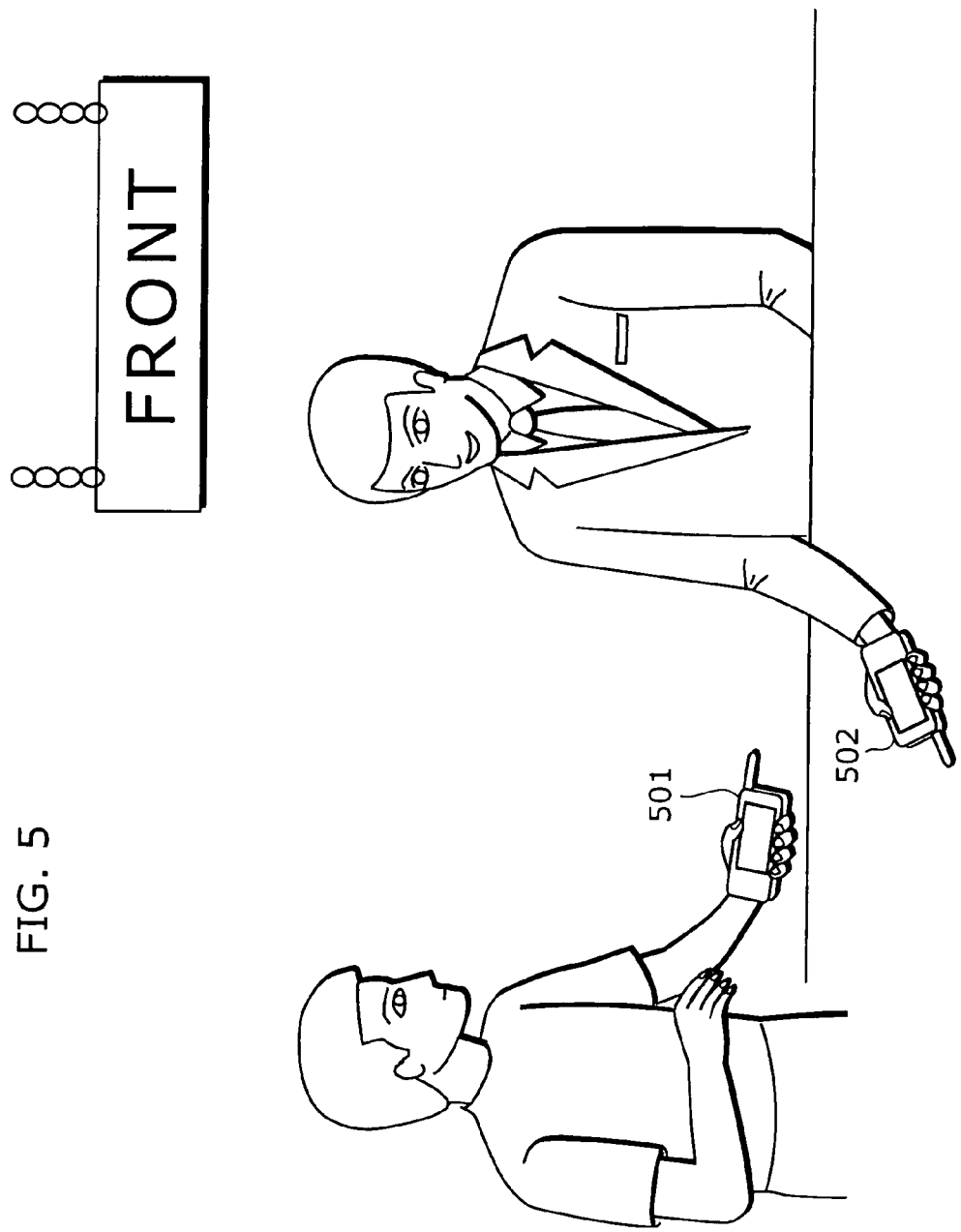
FIG. 5 is a diagram showing an example showing a situation where the dialog supporting devices according to the present invention are used.

The following describes processing performed by the above-structured dialog supporting devices in order to support dialog in different languages. Here, as shown in FIG. 5, it is assumed that a user (user 1), who is a tourist and a native Japanese speaker, has dialog with a partner user (user 2), who is a receptionist at a front desk in a hotel and a native English speaker.

Figure 6A:
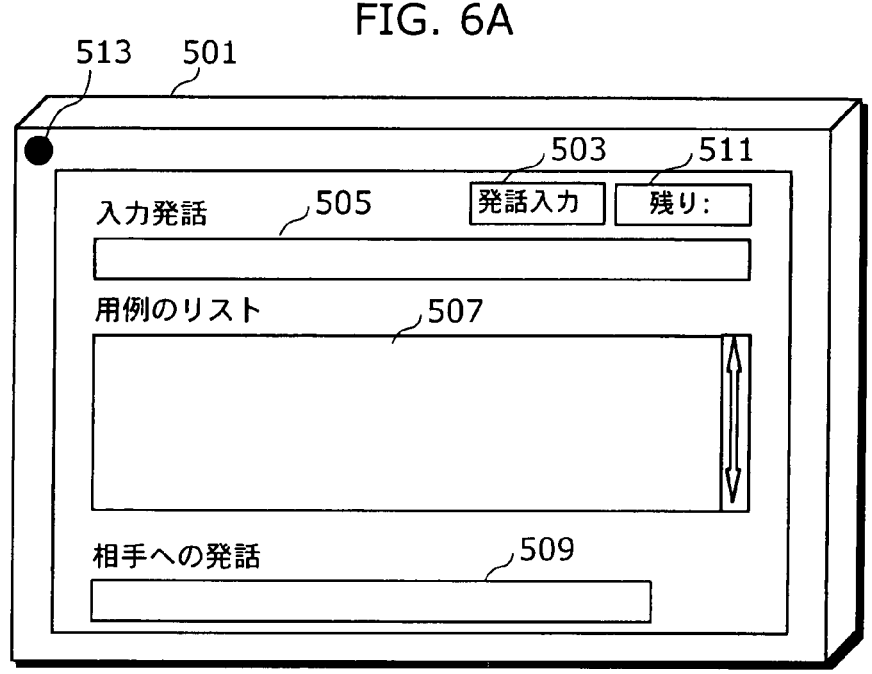
FIGS. 6A and 6B are diagrams showing display examples of the respective dialog supporting devices according to the present invention.
Figure 6B:
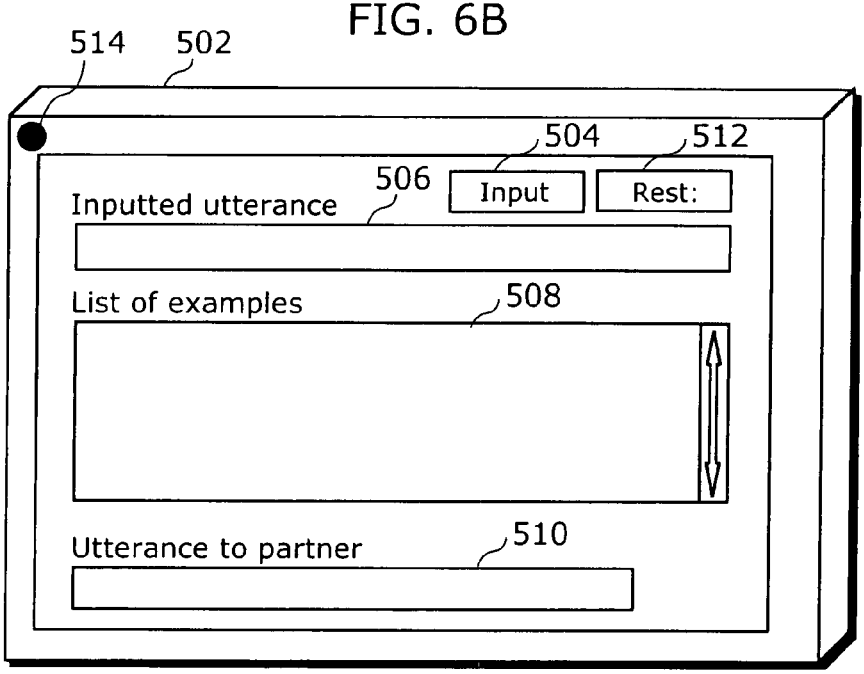

FIGS. 6A and 6B are diagrams showing PDAs in each of which the dialog supporting device is mounted. A PDA 501 shown in FIG. 6A is used by the user 1, while a PDA 502 shown in FIG. 6B is used by the user 2. Each of the users inputs an utterance, which is utterance, by pressing an utterance input button 503 or 504. When the utterance is inputted, the utterance receiving units 102 displays utterance information corresponding to the received utterances on a display area 505 or 506, and the example selecting unit 103 displays a set of example candidates E on a display area 507 or 508. When a desired example e is selected from the example candidates E, a translated example of the selected example is displayed on a display area 509 or 510 and also outputted to the partner's dialog supporting device. Each of display areas 511 and 512 displays difference information. Each of the microphones 513 and 514 is a microphone by which the user's utterance is inputted to the utterance receiving unit 102.

Figure 7A:
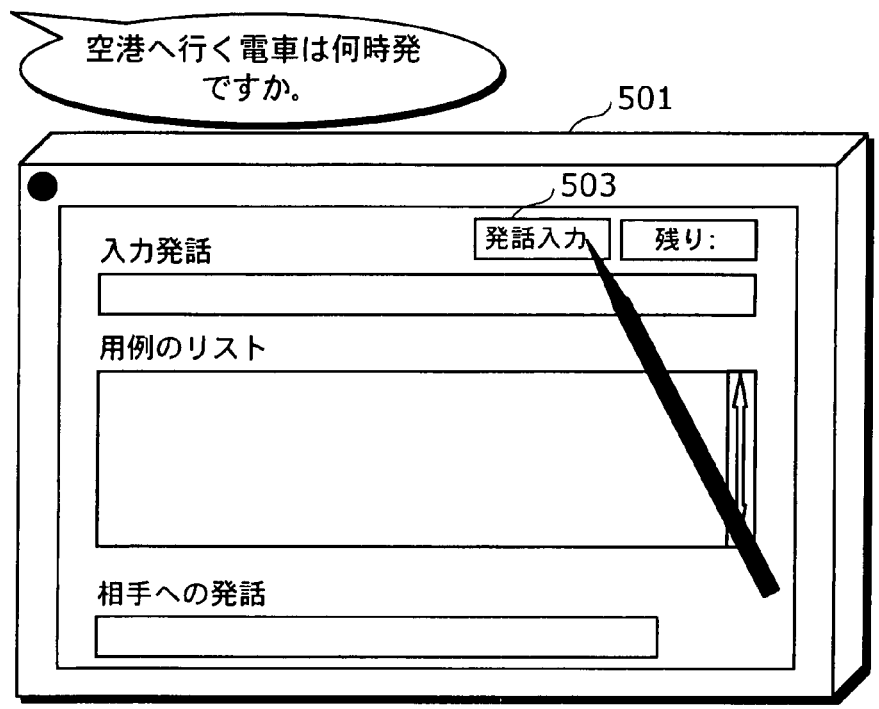
FIGS. 7A and 7B are diagrams showing display examples of the respective dialog supporting devices according to the present invention.
Figure 7B:
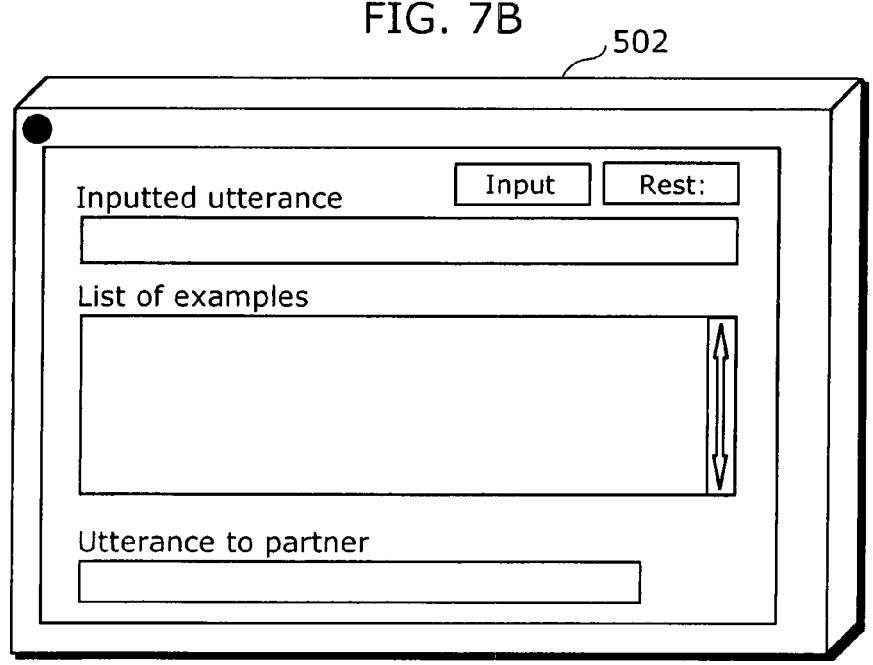
Figure 8A:
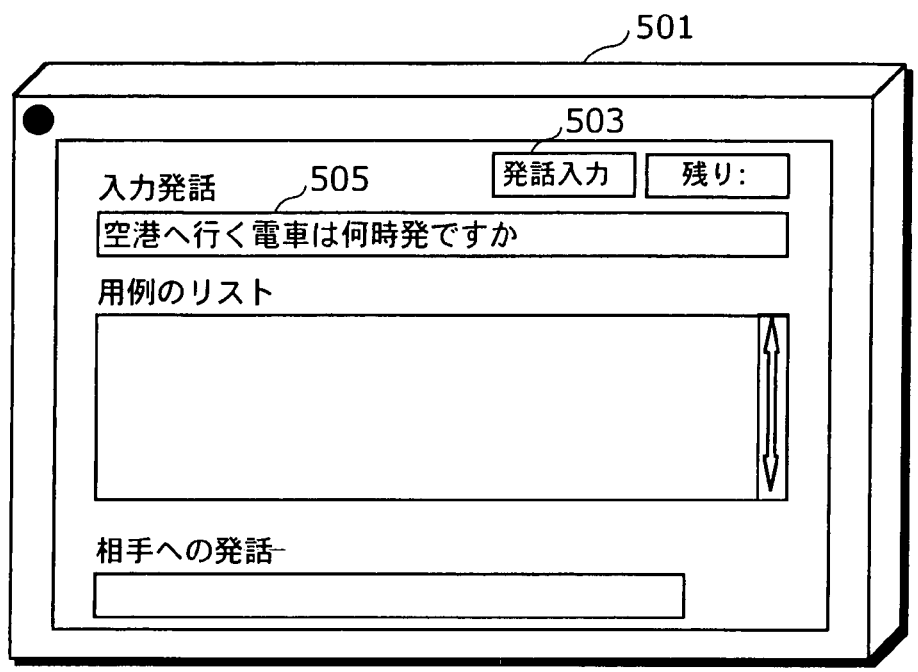
FIGS. 8A and 8B are diagrams showing display examples of the respective dialog supporting devices according to the present invention.
Figure 8B:
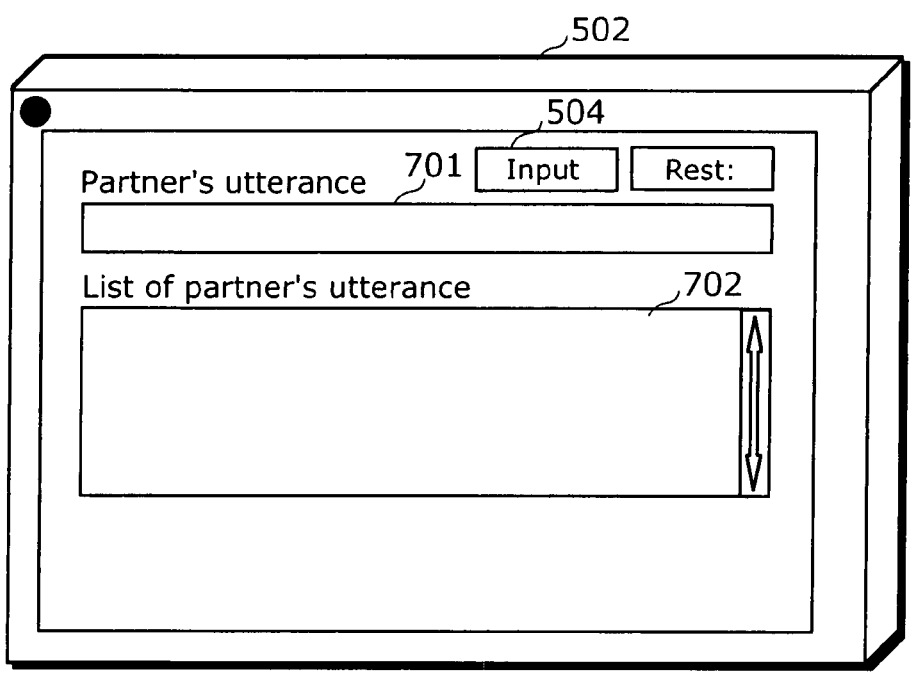

For instance, as shown in FIG. 7A, when the user 1 presses the utterance input button 503 in order to input an utterance "空港へ行く電車は何時発ですか", the utterance is transformed by utterance recognition processing of the utterance receiving unit 102, into utterance information represented by a character string "空港へ行く '電車は何時発ですか" and displayed on the display area 505 as shown in FIG. 8A. The utterance information is inputted to the example selecting unit 103, and then entire utterance information U is set to "空港へ行く電車は何時発ですか" at Step S301, partial utterance information u is set to "空港へ行く電車は何時発ですか" at Step S302, already-translated utterance information v is set to " ", and a mode of the partner's PDA 502 is changed to a receiving state via the user's sending unit 104. At the receiving state, a display area 701 displays a translated example of the last example which has recently been selected by the partner's dialog supporting device, and a display area 701 displays, as histories, translated examples of all examples which have already been selected sequentially by the partner's dialog supporting device. Note that, by pressing the utterance input button 504 to start inputting of an utterance, this receiving state of the PDA 502 is released and back to the state shown in FIG. 6.

Figure 9A:
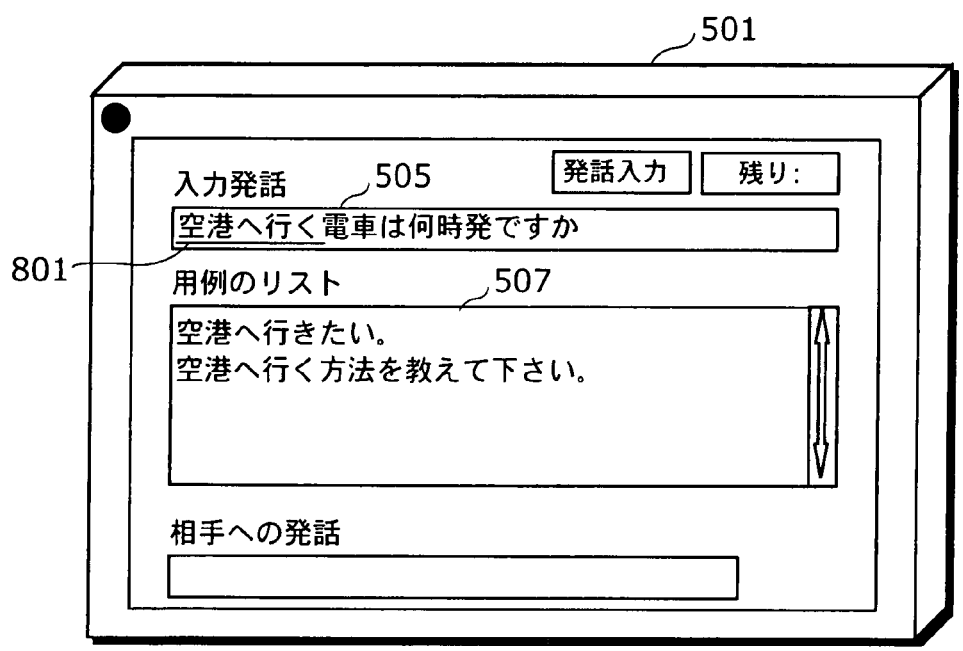
FIGS. 9A and 9B are diagrams showing display examples of the respective dialog supporting devices according to the present invention.
Figure 9B:
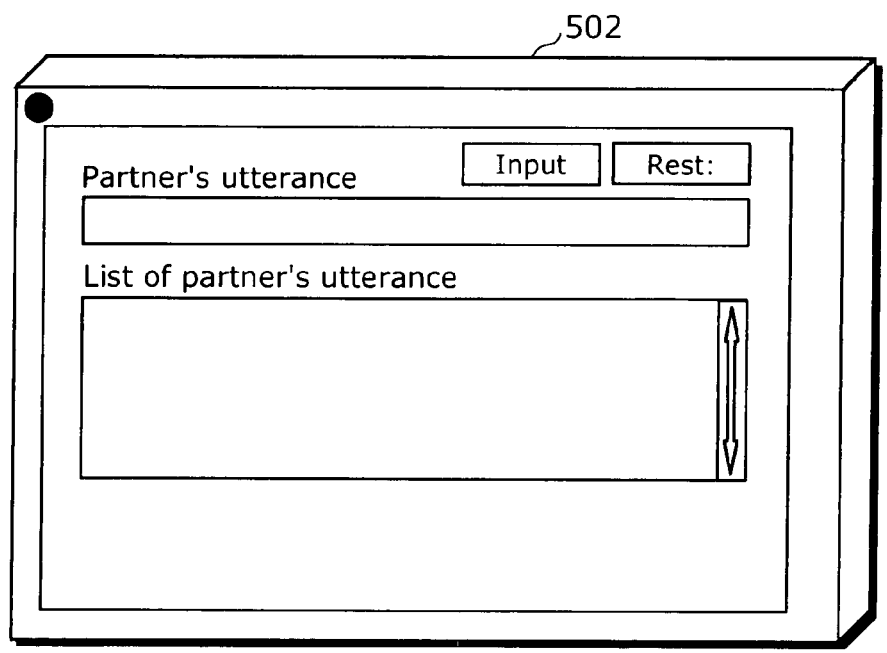
Figure 10A:
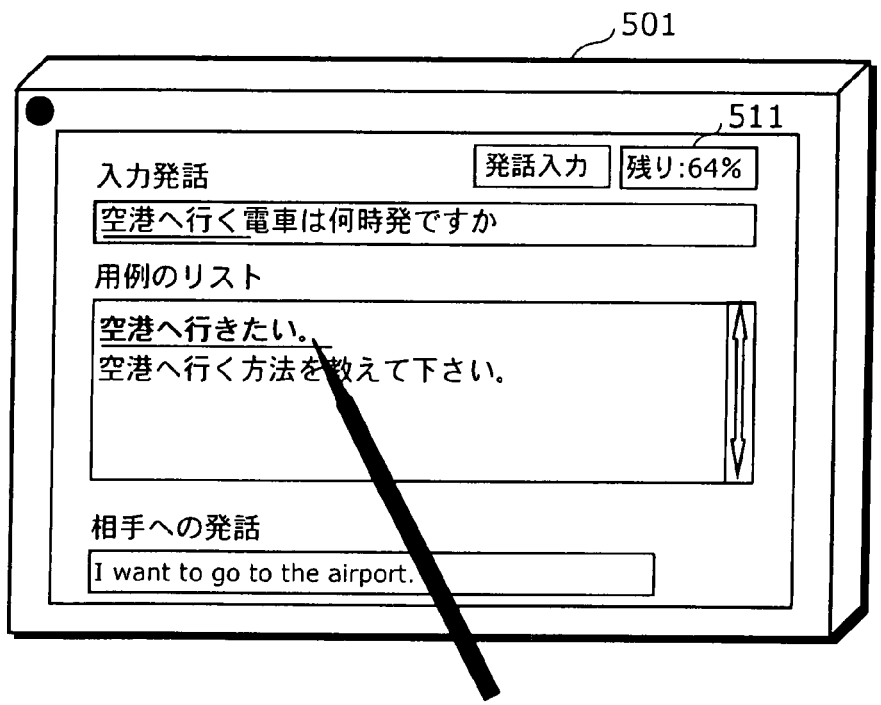
FIGS. 10A and 10B are diagrams showing display examples of the respective dialog supporting devices according to the present invention.
Figure 10B:
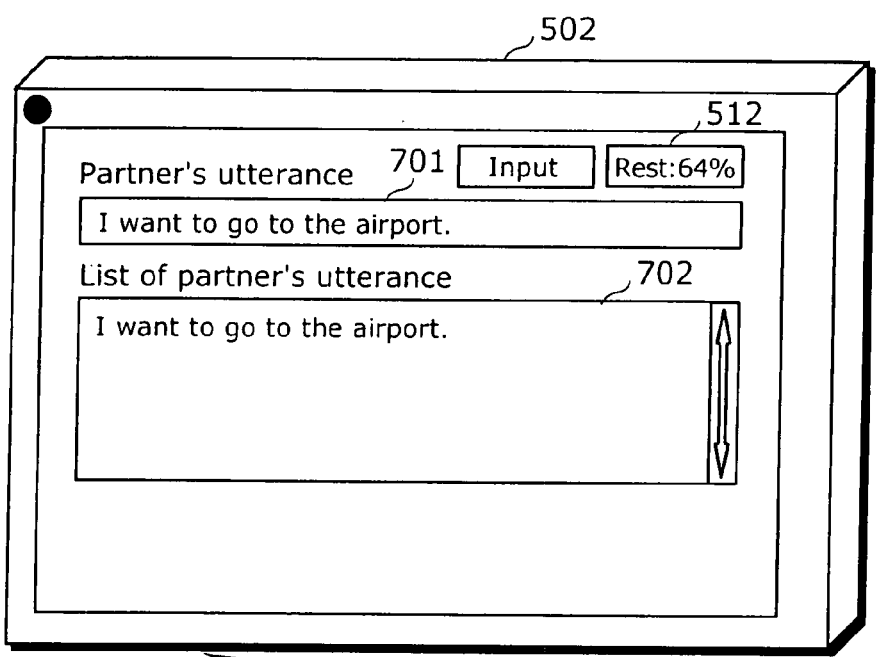

Next, by gradually shorting the partial utterance information u, the example selecting unit 103 calculates each similarity degree between the partial utterance information (remaining seech information u and each of the examples at Steps S303, S304, S405, and S309, in order to eventually obtain example candidates E={空港へ行きたい, 空港へ行く方法を教えて下さい} corresponding to the partial utterance information u="空港へ行く". At Step S306, a value of the partial utterance information u is reflected in displaying on the display area 505, by being underlined as shown in FIG. 9A to be presented to the user 1. In addition, the example selecting unit 103 displays the example candidates E on the display area 507. As shown in FIG. 10A, when the user 1 selects "空港へ行きたい" as a desired example e, a translated example "I want to go to the airport." is provided to the sending unit 104 to be sent. At Step S308, the already-translated utterance information v is set to "空港へ行く" and the partial utterance information u is set to U−v (u=U−v), in other words, the partial utterance information u is updated to "電車は何時発ですか". These information are provided to the utterance difference calculating unit 105, and from these information, the utterance difference calculating unit 105 calculates difference information (U−v)/U=(14−5)/14≈0.64. The resulting difference information is displayed on the display area 511, and the sending unit 104 outputs the translated example "I want to go to the airport." and the difference information "0.64" to the PDA 502. These information received by the receiving unit 106 of the PDA 502 are displayed by the utterance outputting unit 107 on the display areas 701 and 702, respectively, as shown in FIG. 10B. Further, the utterance outputting unit 107 of the PDA 502 outputs utterance data corresponding to "I want to go to the airport." using utterance synthesis processing. Here, the difference information is displayed on the display area 512, so that the user 2 can learn that 64% of what the user 1 wishes to say still remains to be received. Thus, since more than a half of the utterances of the user 1 has not yet been received, the user 2 can objectively judge to wait for the remaining utterances rather than immediately replay to the current utterance "I want to go to the airport.", so that unnecessary additional utterances can be prevented.

Figure 11A:
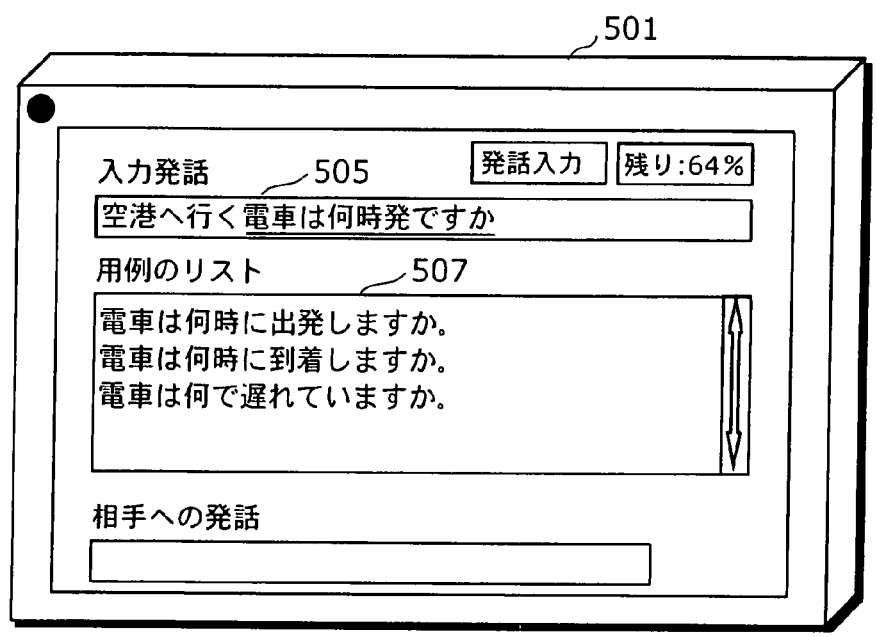
FIGS. 11A and 11B are diagrams showing display examples of the respective dialog supporting devices according to the present invention.
Figure 12A:
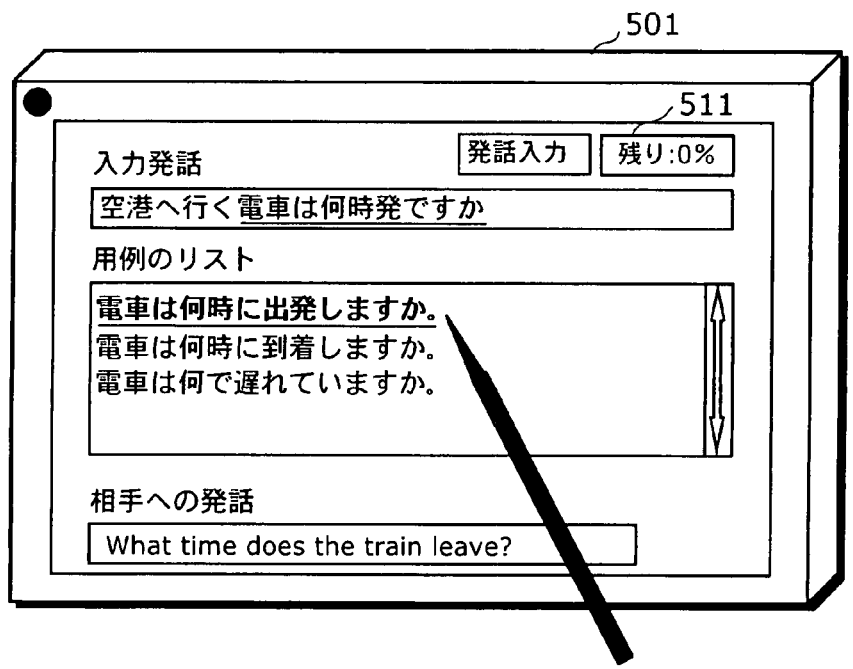
FIGS. 12A and 12B are diagrams showing display examples of the respective dialog supporting devices according to the present invention.
Figure 12B:
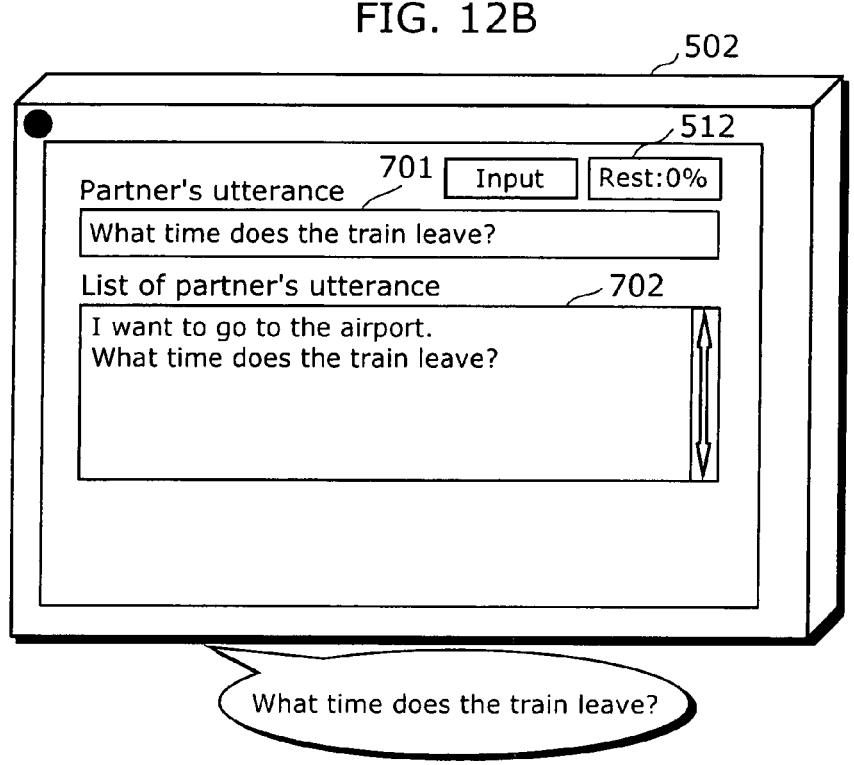

Next, in the case where at Step S310 the partial utterance information u is "電車は何時発ですか" and then the processing returns to Step S303, example candidates E={電車は何時に出発しますか, 電車は何時に到着しますか, 電車は何で遅れていますか} are obtained at Step 305 in the above-described manner, and the display areas 505 and 507 display at Step 306 the partial utterance information u and the example candidates E, respectively, as shown in FIG. 11A. When the user 1 selects a desired example "電車は何時に出発しますか" in the above-described manner as shown in FIG. 12A, a translated example "What time does the train leave?" is displayed on the display area 701 as the last selected sentence and on the display area 702 as a new history, and also outputted as utterance from the PDA 502 as shown in FIG. 12B. At Step S308, the already-translated utterance information v is updated to "空港へ行く電車は何時発ですか" and the partial utterance information u is updated to " ". These information are outputted to the utterance difference calculating unit 105, and from these information the utterance difference calculating unit 105 obtains difference information (U−v)/U=(14−14)/14=0. The resulting difference information is displayed on the display area 511 and also on the display area 512. The user 2 can learn that the display area 702 now displays all that the user 1 wishes to say. Thus, it is possible to objectively judge to reply to the display area 702, so that the user 2 can replay to the user 1 with minimum utterances.

Figure 13A:
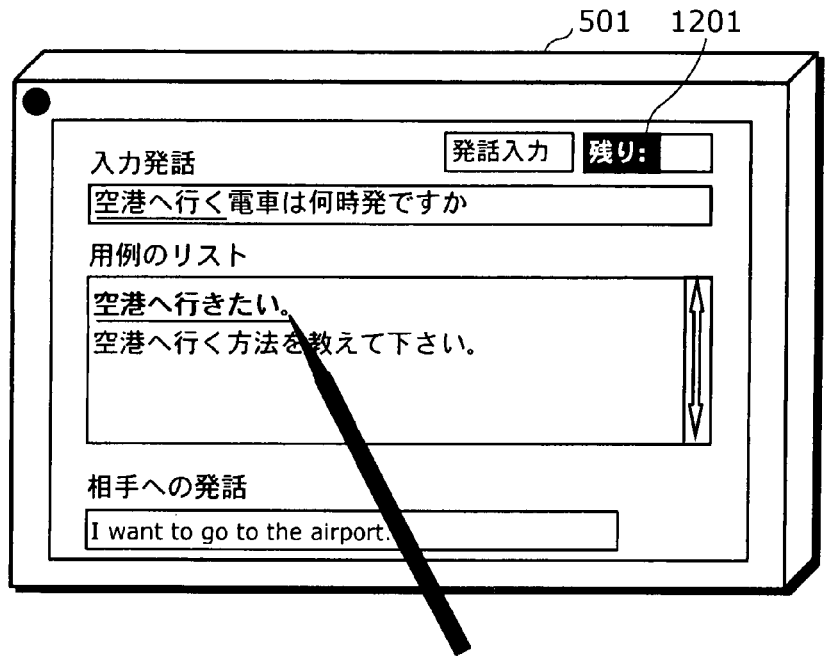
FIGS. 13A and 13B are diagrams showing display examples of the respective dialog supporting devices according to the present invention.
Figure 13B:
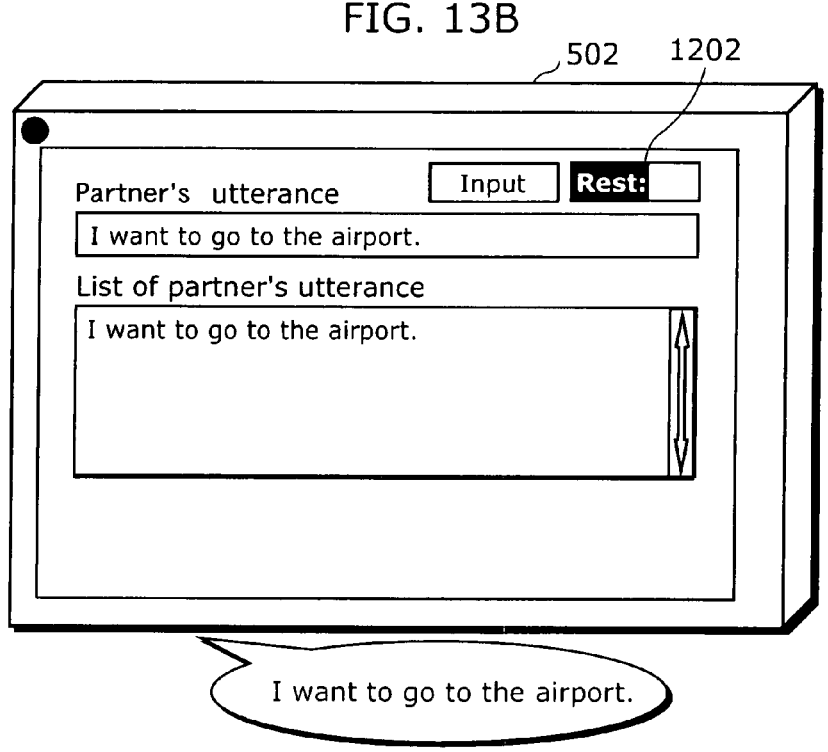
Figure 14A:
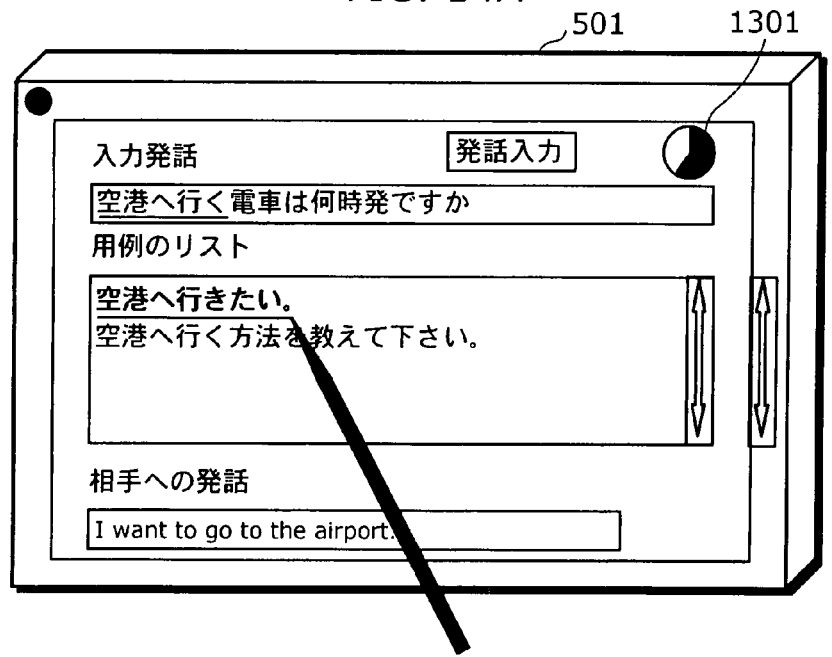
FIGS. 14A and 14B are diagrams showing display examples of the respective dialog supporting devices according to the present invention.
Figure 14B:
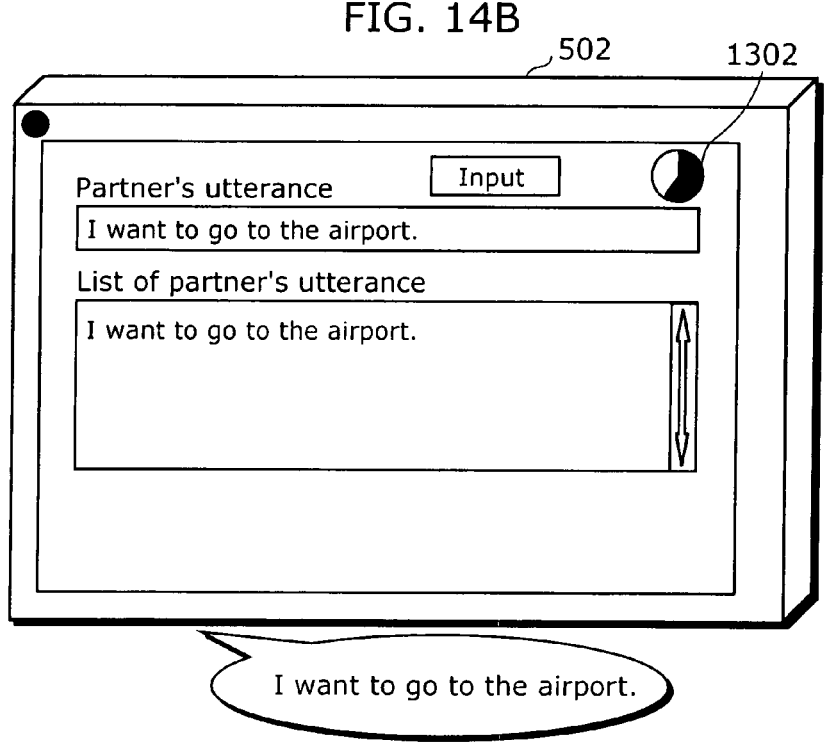
Figure 15A:
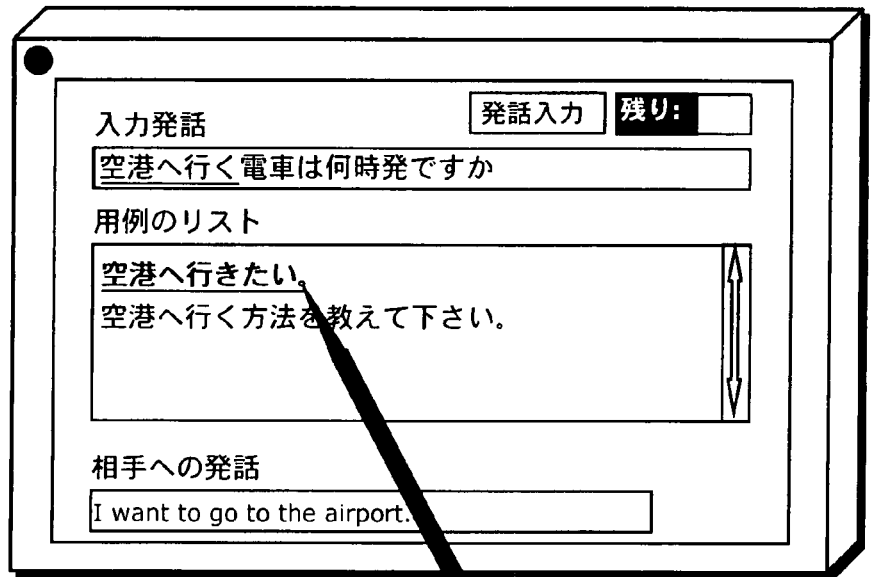
FIGS. 15A and 15B are diagrams showing display examples of the respective dialog supporting device according to the present invention.
Figure 15B:
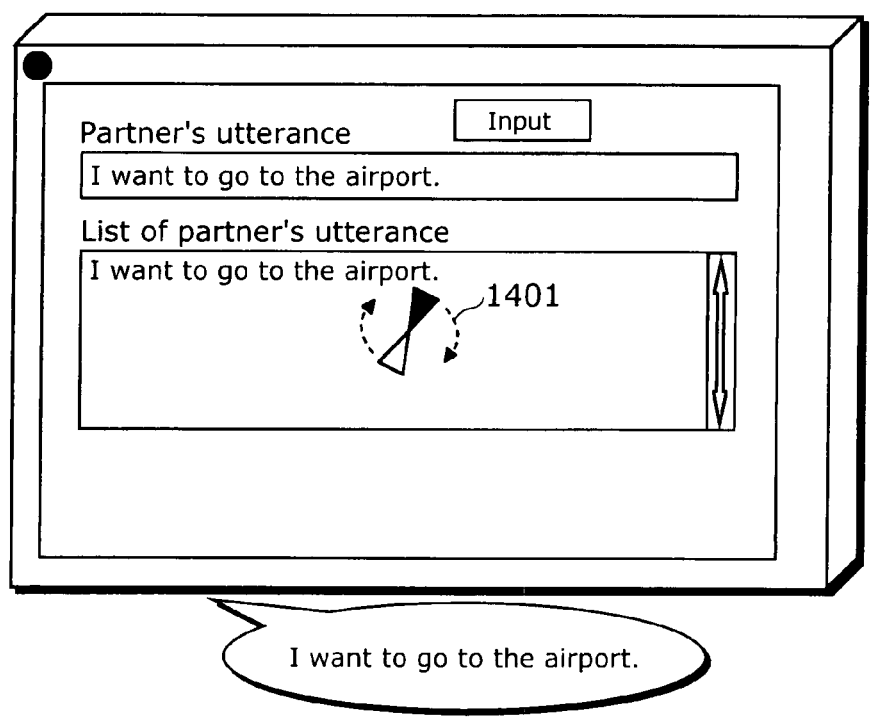

Note that in the above description, the difference information is represented by a numeric value as one example, but may be expressed by a figure such as bars 1201 and 1202 as shown in FIGS. 13A and 13B or circle graphs 1301 and 1302 as shown in FIGS. 14A and 14B. Note also that the difference information may be used as a control parameter for controlling a metaphor expressing the difference information. For instance, the difference information may be expressed by a rotating sand clock 1401 as shown in FIG. 15B whose rotation speed is proportional to the difference information. As described above, by expressing the difference information as the figure or the metaphor, the user can easily learn the difference information, so that stress of the user waiting for the next utterance is reduced.

Second Embodiment

Figure 16:
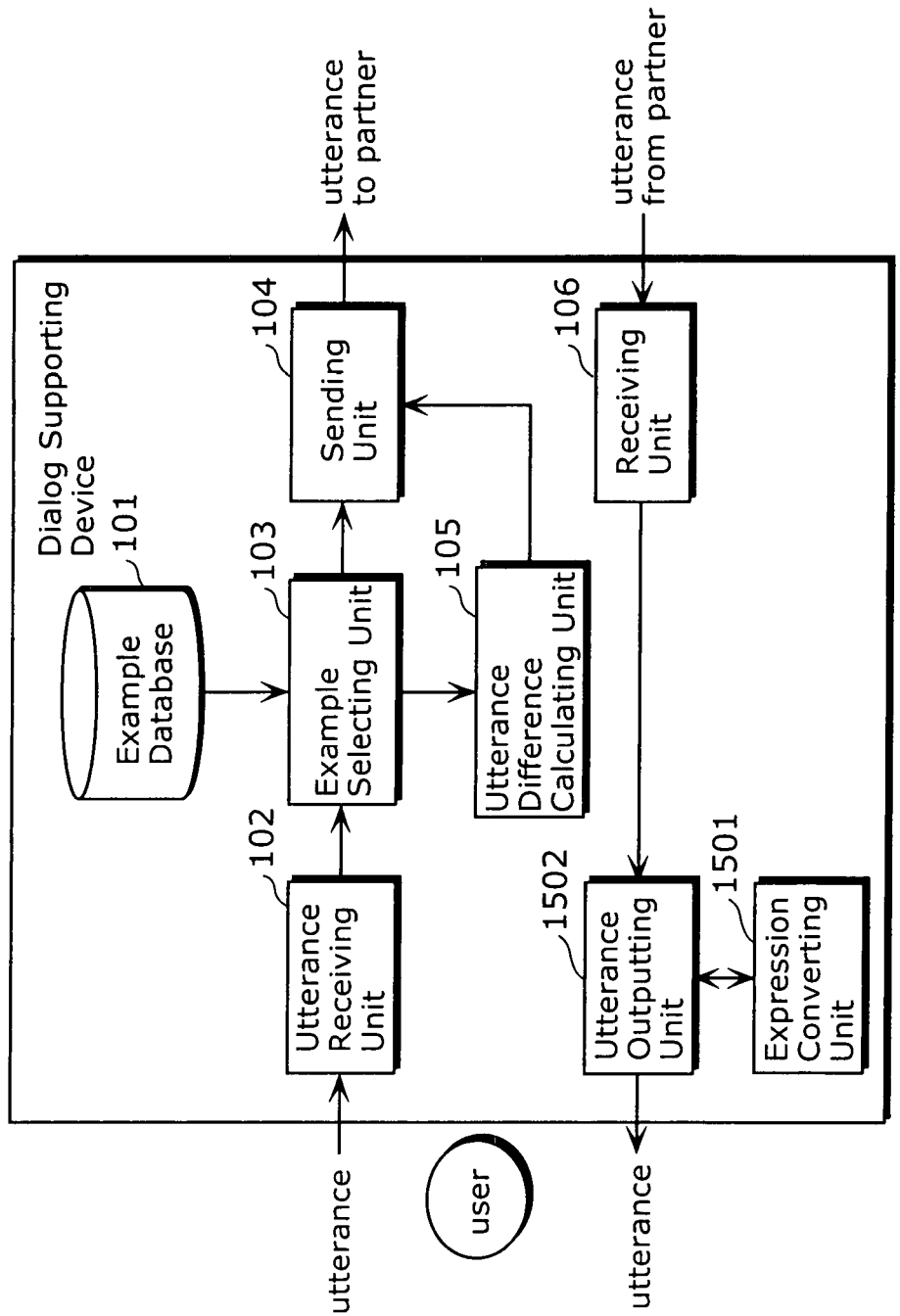
FIG. 16 is a block diagram showing a structure of a dialog supporting device according to the second embodiment of the present invention.
Figure 18A:
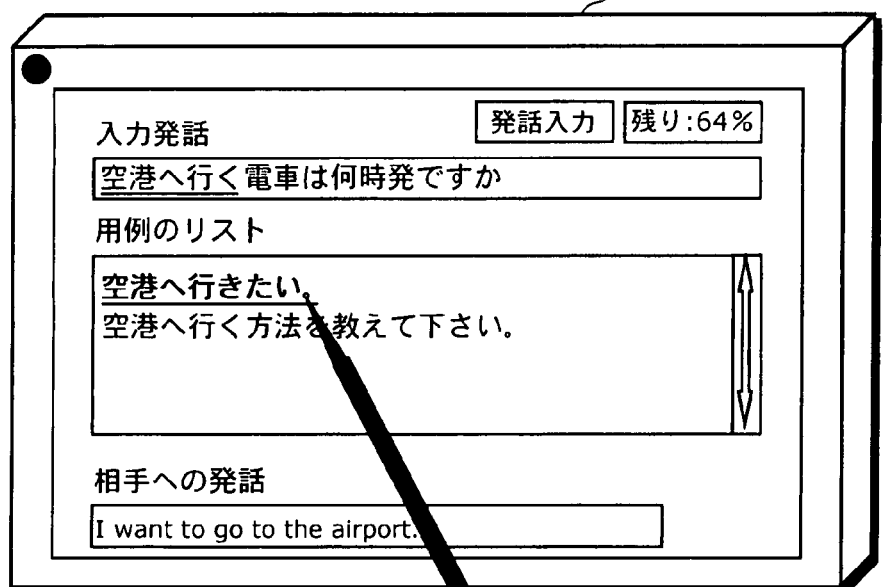
FIGS. 18A and 18B are diagrams showing display examples of the respective dialog supporting devices according to the present invention.
Figure 18B:
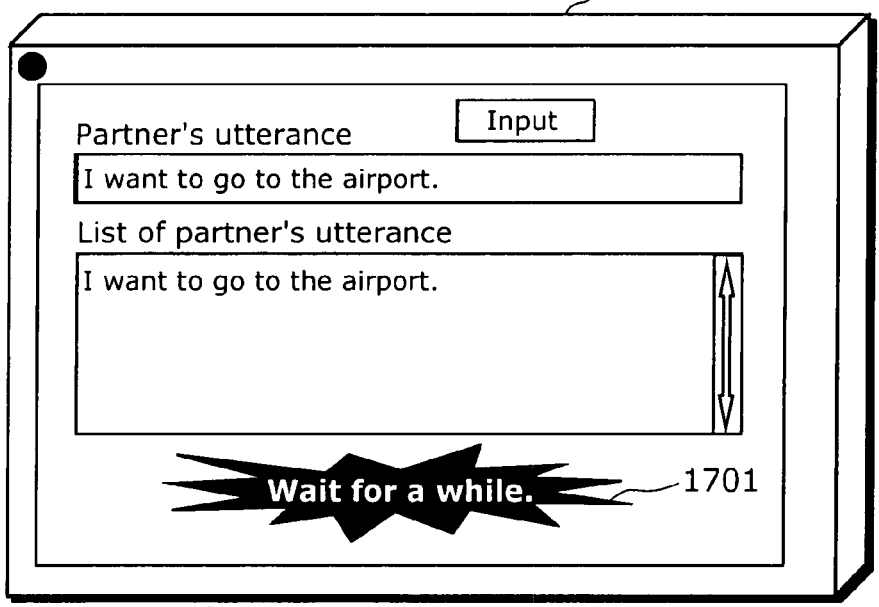

Note also that, as shown in FIG. 16, in addition to the structure of the dialog supporting device of the first embodiment shown in FIG. 1, a dialog supporting device of the second embodiment of the present invention may have an expression conversion unit 1501 for presenting the user with the difference information by language expression. As shown in FIG. 17, the expression conversion unit 1501 has conversion rules by which the difference information is converted to the language expression. When the difference information is 0.64 at the state of FIG. 10, according to the structure of FIG. 16, the difference information is converted to "Wait for a while." by conversion rule No. 2 of the expression converting unit 1501, and presented to the partner user as qualitative language expression 1701 as shown in FIG. 18B. As described above, by expressing the difference information as an appropriate language expression, stress of the user waiting for a next utterance is reduced.

Third Embodiment

Figure 19:
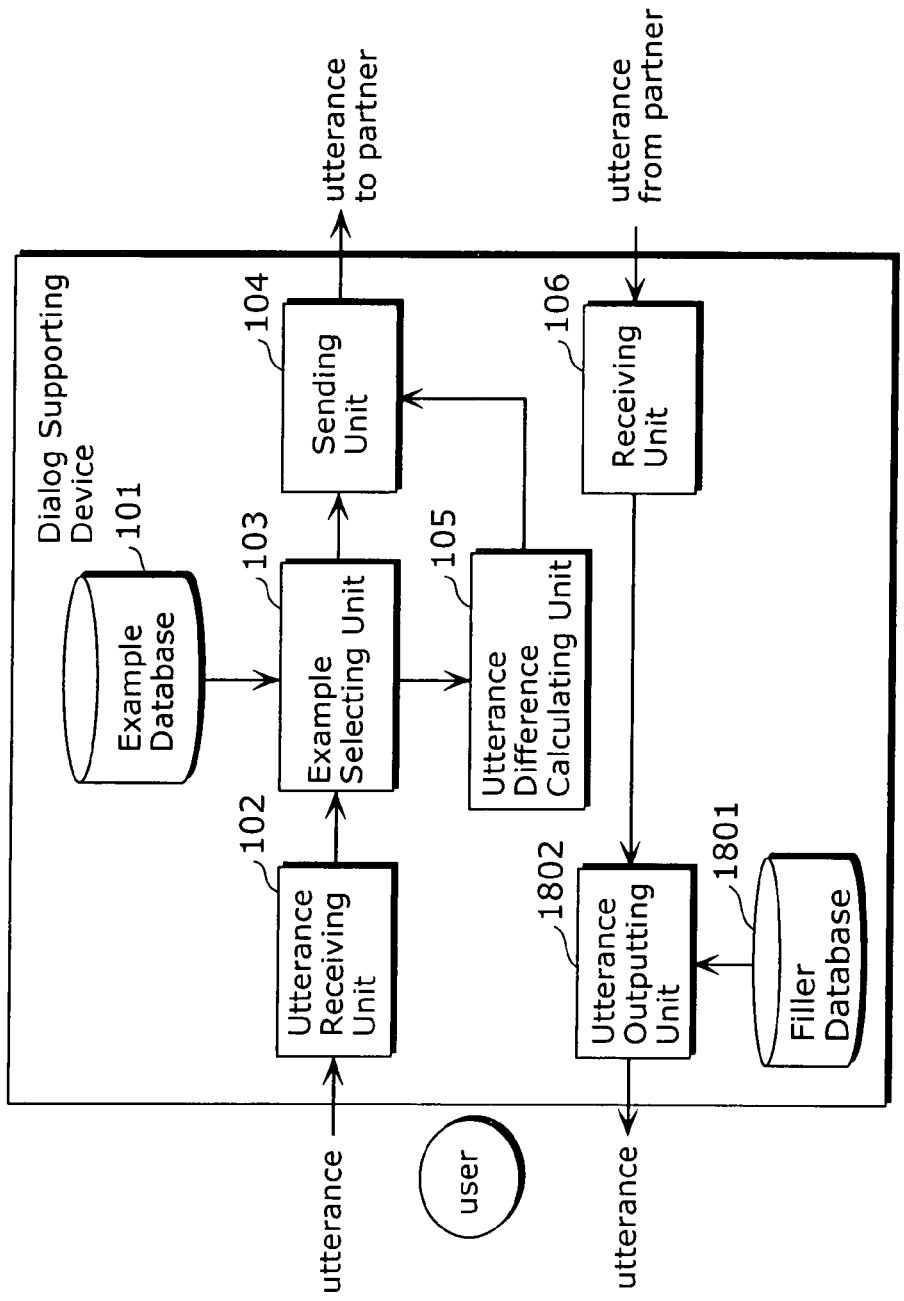
FIG. 19 is a block diagram showing a structure of a dialog supporting device according to the third embodiment of the present invention.

Note also that, as shown in FIG. 19, in addition to the structure of the dialog supporting device of the first embodiment shown FIG. 1, a dialog supporting device of the third embodiment of the present invention may have a filler database 1801.

In such a structure, when the difference information sent from the partner's dialog supporting device is not 0, the utterance outputting unit 107 may use the difference information as a control parameter for generating regularly or at random a sentence corresponding to a filler, such as "えーっと", "そうですね", or "And please wait," in the filler database 1801 and present the user with the generated sentence until the user's dialog supporting device receives a next example from the partner's dialog supporting device.

Figure 11B:
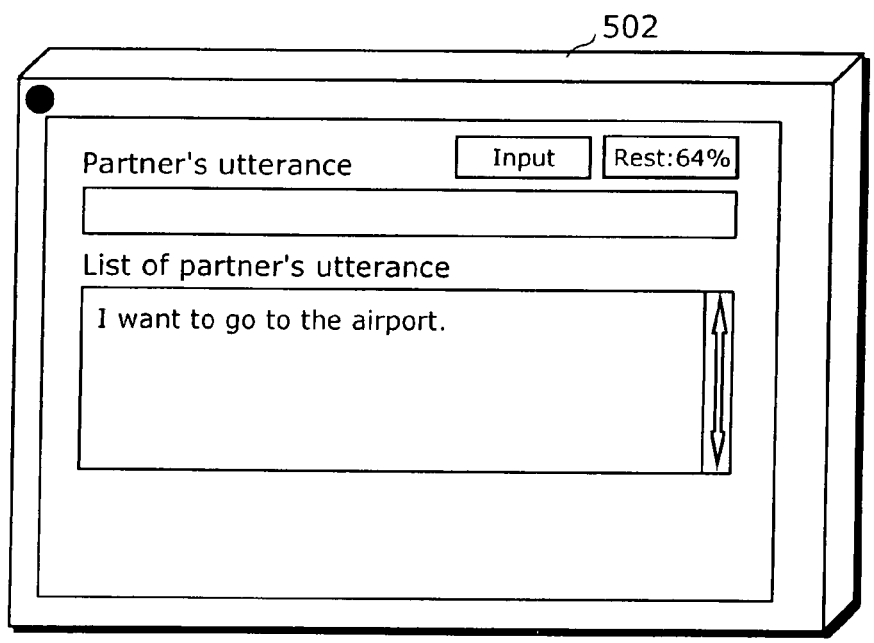
Figure 20A:
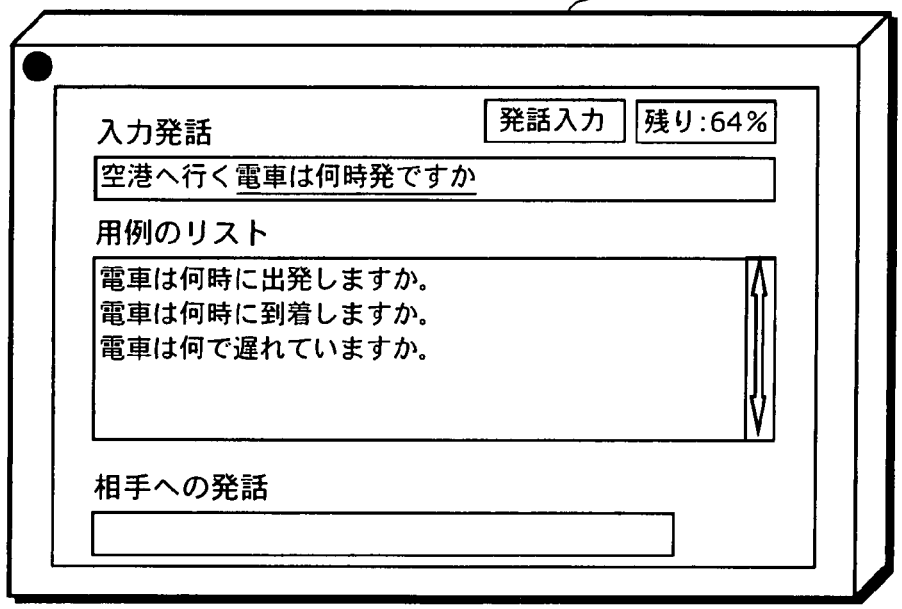
FIGS. 20A and 20B are diagrams showing display examples of the respective dialog supporting devices according to the present invention.
Figure 20B:
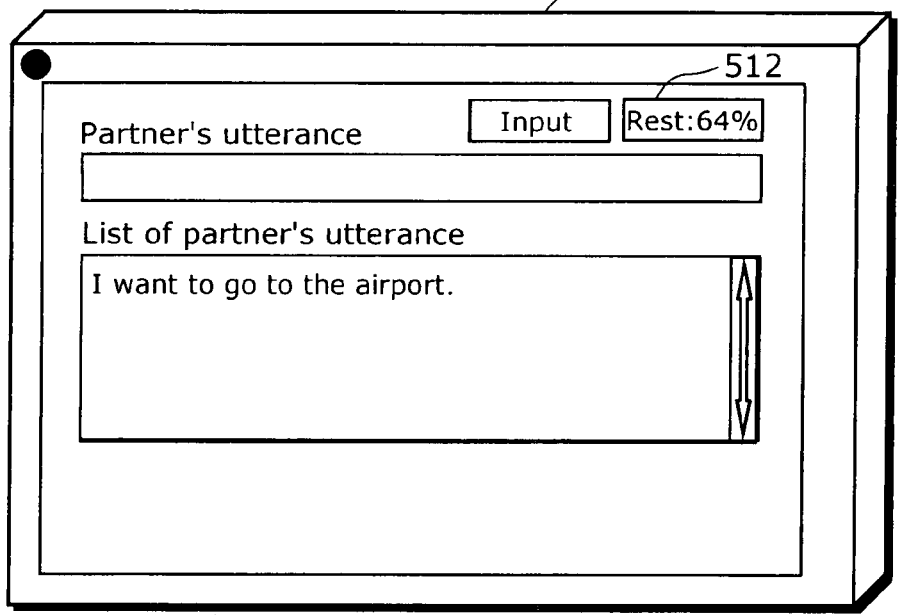

In this structure of FIG. 19, at the state of FIG. 11B, filler utterances are reproduced at random in the PDA 502 as shown in FIG. 20B. By acoustically filling a silent time with appropriate fillers until the next utterance is received, it is possible to reduce stress of the user waiting for the next utterance. Here, the displaying of the difference information on the display area 512 as shown in FIG. 20 is optional.

Although the first to third embodiments have been described assuming that the user speaks Japanese and the partner user speaks English when the dialog supporting devices are used, the present invention can be applied to dialog in any languages such as the following situation where a user speaks Chinese and a partner user speaks English. In this situation, in the same manner as shown in FIG. 5, it is assumed that the user (user 1), who is a tourist and a native Chinese speaker, has dialog with the partner user (user 2), who is a receptionist at a front desk in a hotel and a native English speaker. Note that a structure that is the same as the above-described structure is not described again further below.

FIG. 21 is a table showing an example of examples held in the example database 101. Language 1 corresponding to the first examples is Chinese, while language 2 corresponding to the second examples is English, and a pair of examples in languages 1 and 2 is a pair of an original sentence and a translated sentence shown side by side. For instance, when an example "想去机场" of utterance No. 16 in language 1 is selected by the sentence selecting unit 103, an associated translated example "I want to go to the airport." in lo language 2 is outputted.

Figure 22A:
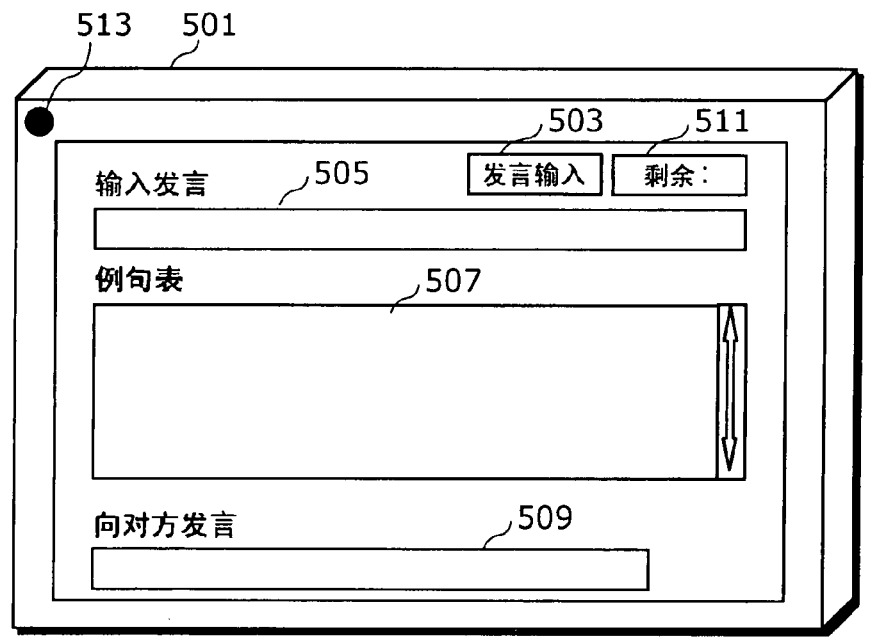
FIGS. 22A and 22B are diagrams showing display examples of the respective dialog supporting devices according to the present invention.
Figure 22B:
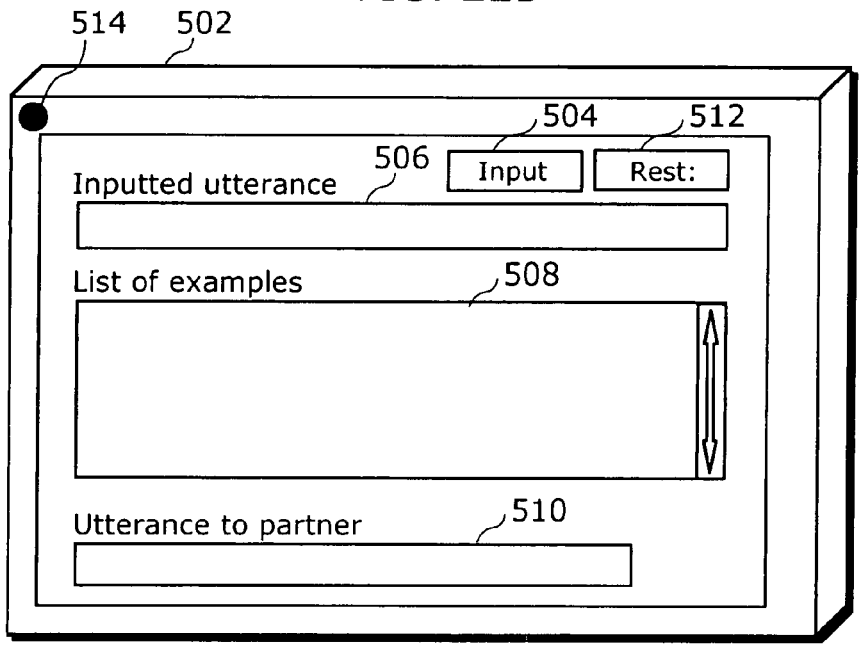

FIGS. 22A and 22B are diagrams showing PDAs in each of which the dialog supporting device is mounted. A PDA 501 shown in FIG. 22A is used by the user 1, while a PDA 502 shown in FIG. 22B is used by the user 2. Each of the users inputs an utterance, which is utterance, by pressing an utterance input button 503 or 504. When the utterance is inputted, the utterance received by the utterance receiving unit 102 is displayed as utterance information on a display area 505 or 506, and example candidates E are displayed on a display area 507 or 508 by the example selecting unit 103. When a desired example e is selected from the example candidates E, a translated example of the selected example is displayed on a display area 509 or 510 and also outputted to the partner's dialog supporting device. Each of display areas 511 and 512 displays difference information. Each of the microphones 513 and 514 is a microphone by which the user's utterance is inputted to the utterance receiving unit 102.

Figure 23A:
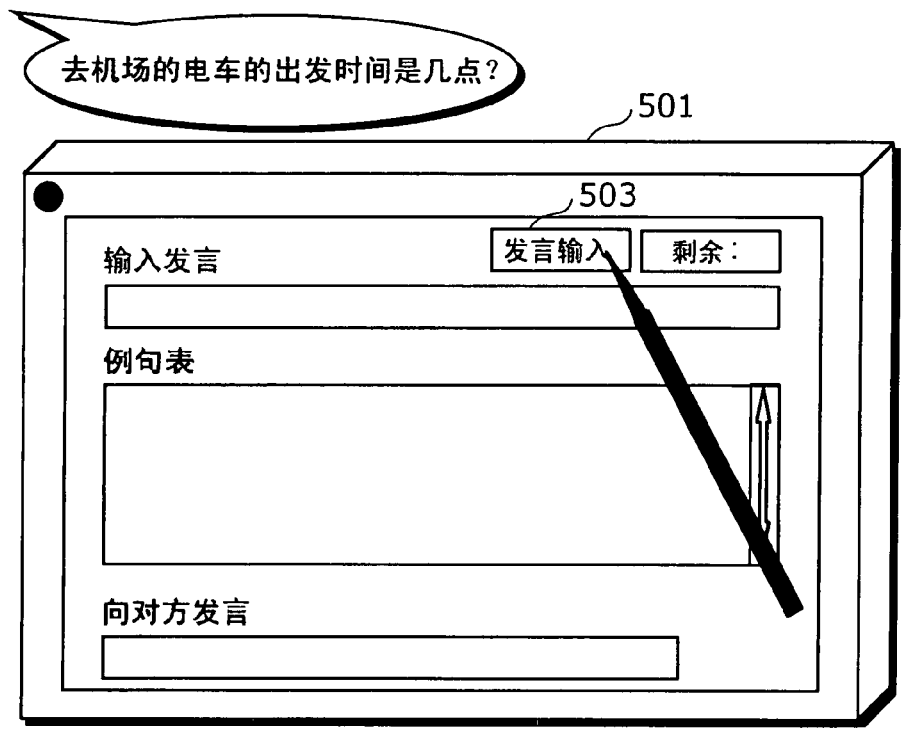
FIGS. 23A and 23B are diagrams showing display examples of the respective dialog supporting devices according to the present invention.
Figure 23B:
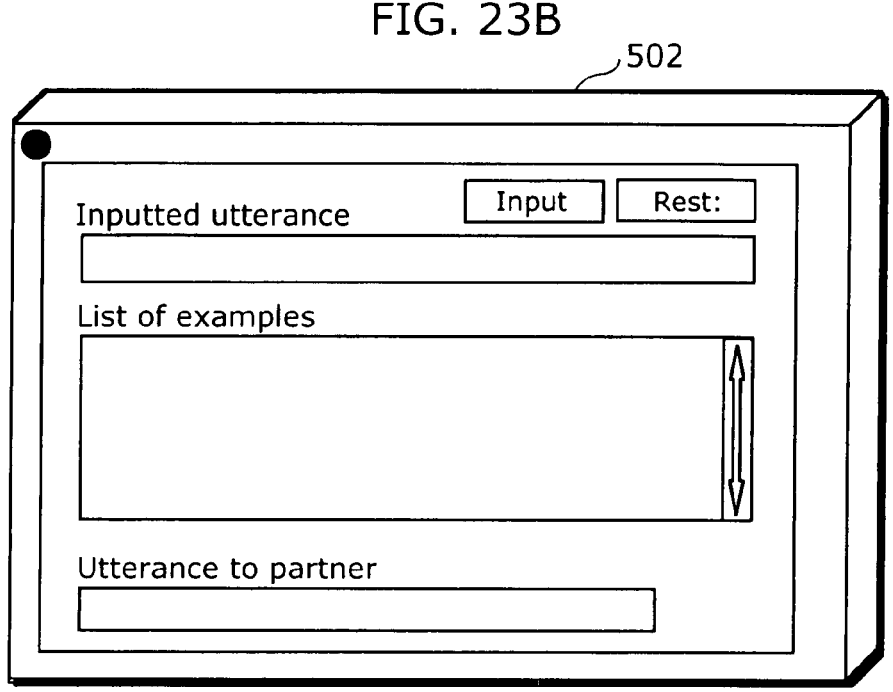
Figure 24A:
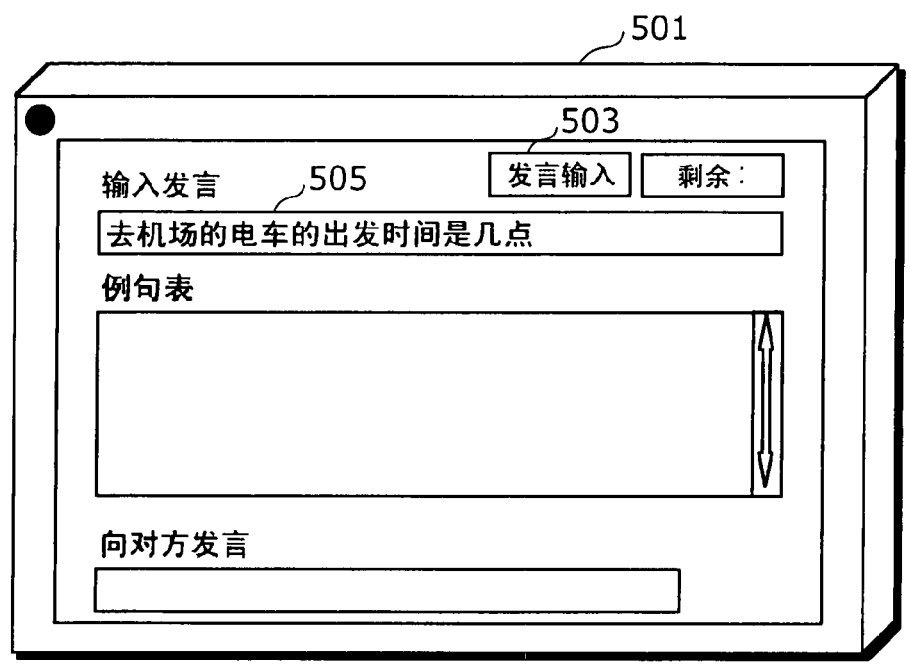
FIGS. 24A and 24B are diagrams showing display examples of the respective dialog supporting devices according to the present invention.
Figure 24B:
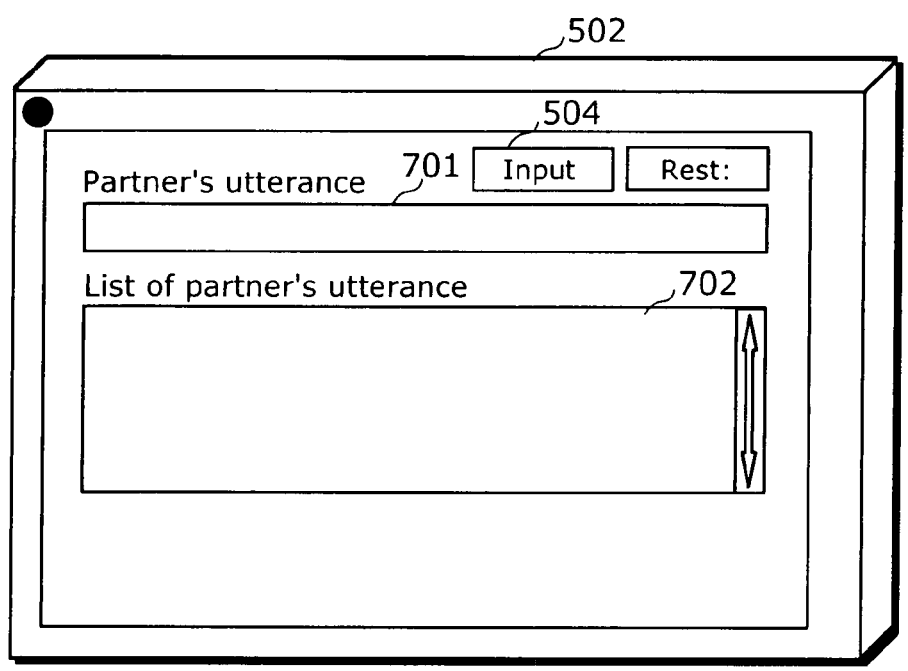

For instance, as shown in FIG. 23A, when the user 1 presses the utterance input button 503 to input an utterance "去机场的电车的出发时间是几点", the utterance is transformed by utterance recognition processing of the utterance receiving unit 102, into utterance information represented by a character string "卡机场的电车的出发时间是几点", and then displayed on the display area 505 as shown in FIG. 24A. The utterance information is inputted to the example selecting unit 103, and then entire utterance information U is set to "去机场的电车的出发时间是几点" at Step S301, partial utterance information u is set to "去机场的电车的出发时间是几点", already-translated utterance information v is set to " " at Step S302, and a mode of the PDA 502 of the partner user 2 is changed to a receiving state via the sending unit 104 of the user's dialog supporting device. At the receiving state, a display area 701 displays a translated example of the last example which has recently been selected by the partner's dialog supporting device, and a display area 701 displays, as histories, translated examples of all examples which have already been selected sequentially by the partner's dialog supporting device. Note that, by pressing the utterance input button 504 to start inputting of an utterance, the receiving state of the PDA 502 is released and back to the state of FIG. 22.

Figure 25A:
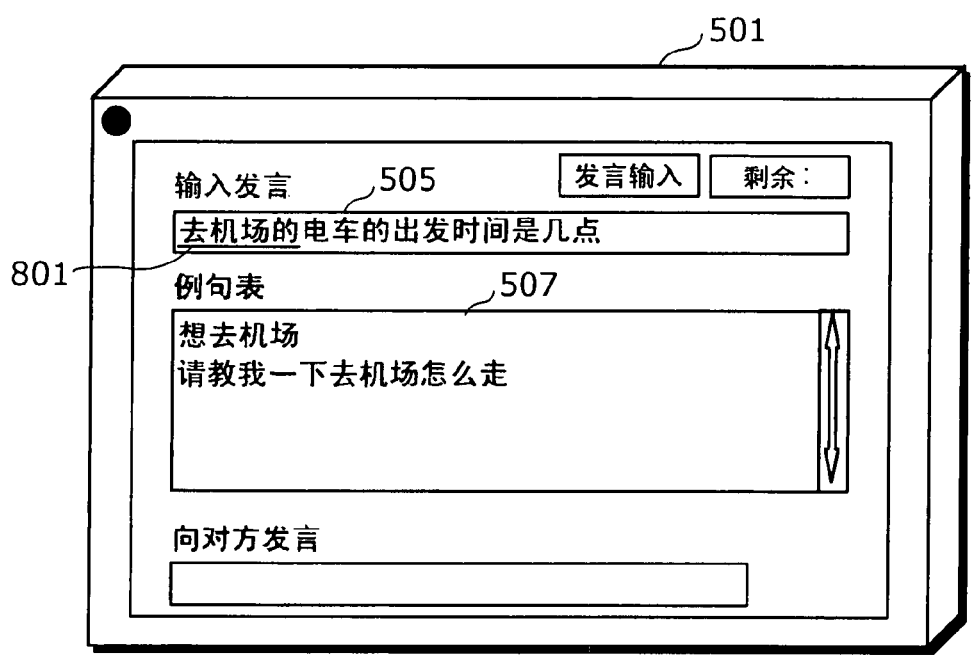
FIGS. 25A and 25B are diagrams showing display examples of the respective dialog supporting devices according to the present invention.
Figure 25B:
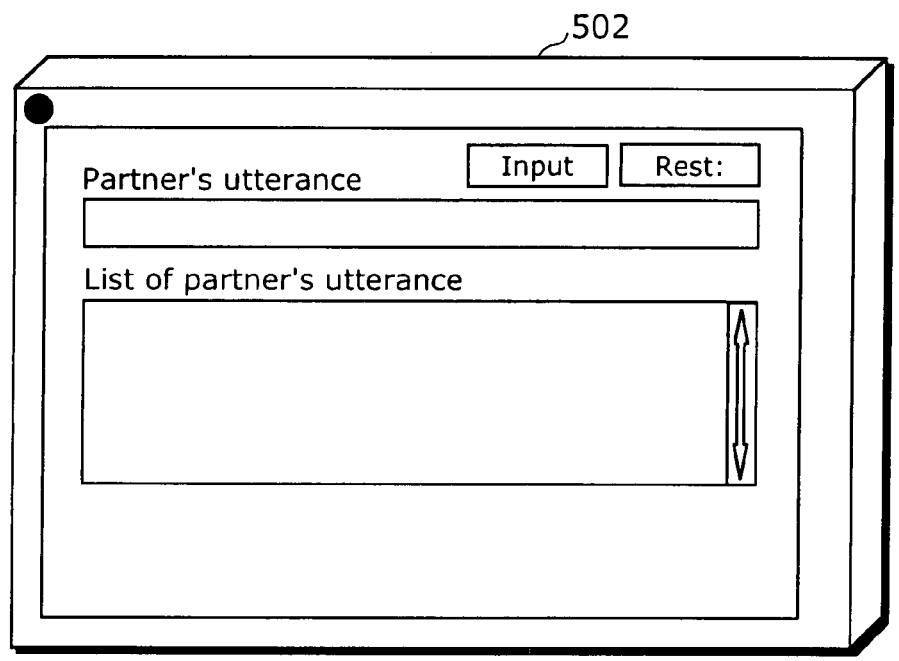
Figure 26A:
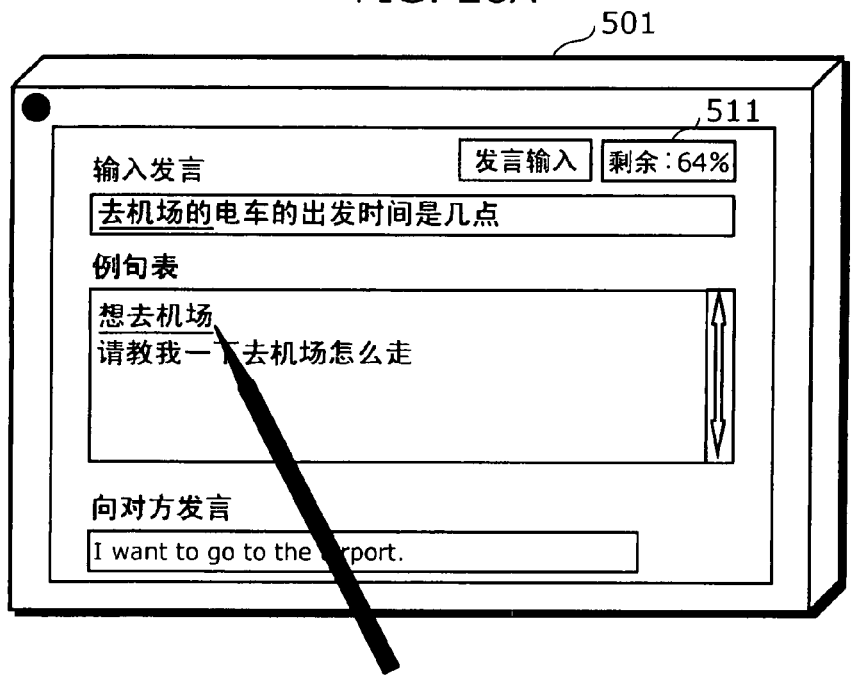
FIGS. 26A and 26B are diagrams showing display examples of the respective dialog supporting devices according to the present invention.
Figure 26B:
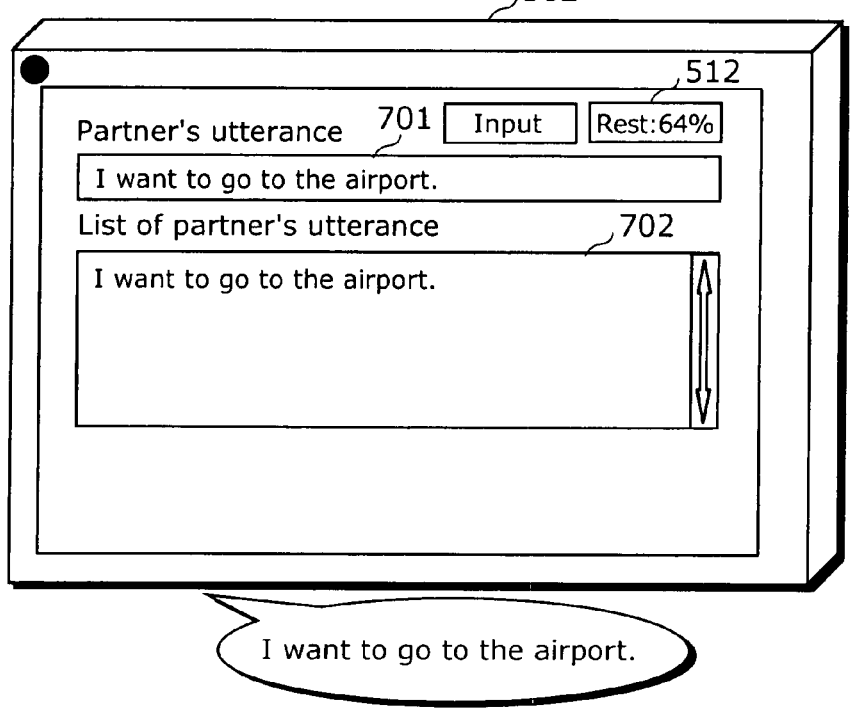

Next, by gradually shorting the partial utterance information u, the example selecting unit 103 calculates each similarity degree between the partial utterance information (remaining utterance information) u and each of the examples at Steps S303, S304, S405, and S309, in order to eventually obtain example candidates E={想去机场, 请教我一下去机场怎么走} corresponding to the remaining partial utterance information u="去机场的". At Step S306, a value of the partial utterance information u is reflected in displaying on the display area 505, by being underlined as shown in FIG. 25A to be presented to the user 1. In addition, the example selecting unit 103 displays the example candidates E on the display area 507. As shown in FIG. 26A, when the user 1 selects "想去机场" as an example e, at Step S307 a translated example "I want to go to the airport." is provided to the sending unit 104 to be sent. At Step S308, already-translated utterance information is set to "去机场的" and partial utterance information u is set to U−v (u=U−v), in other words, the partial utterance information u is updated to "电车的出发时间是几点". These information are provided to the utterance difference calculating unit 105, and from these information the utterance difference calculating unit 105 calculates difference information (U−v)/U=(14−4)/14≈0.71 using the number of characters. The resulting difference information is displayed on the display area 511, and the sending unit 104 sends the translated example "I want to go to the airport." and the difference information "0.71" to the PDA 502. These information received by the receiving unit 106 of the PDA 502 are displayed by the utterance outputting unit 107 on the display areas 701 and 702 as shown in FIG. 26B. Furthermore, the utterance outputting unit 107 of the PDA 502 outputs utterance data corresponding to "I want to go to the airport." using utterance synthesis processing. Here, the difference information is displayed on the display area 512, so that the user 2 can learn that 71% of what the user 1 wishes to say is still remained. Thus, since more than a half of the utterances of the user 1 has not yet been received, the user 2 can objectively judge to wait for the remaining utterances rather than immediately replay to the current utterance "I want to go to the airport.", so that unnecessary additional utterances can be prevented.

Figure 27A:
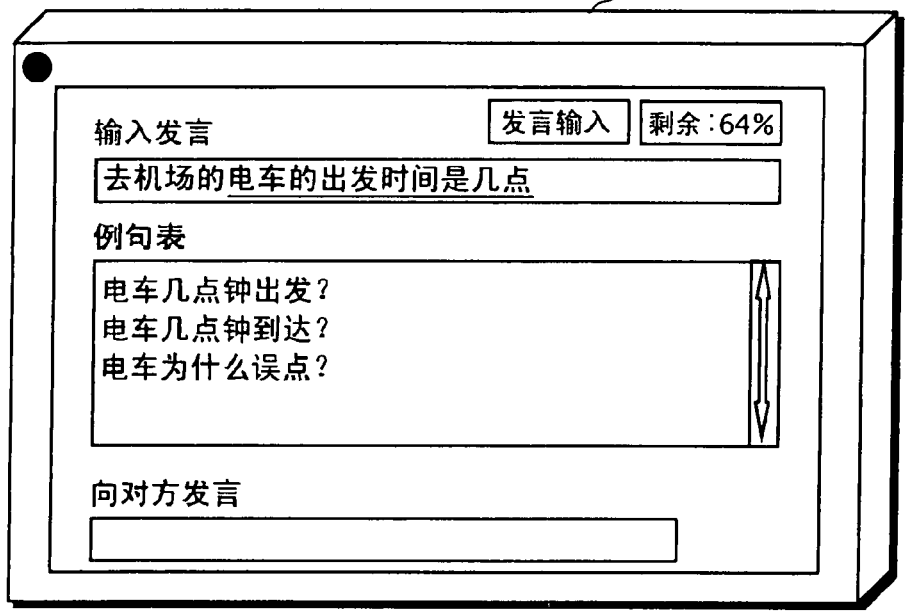
FIGS. 27A and 27B are diagrams showing display examples of the respective dialog supporting devices according to the present invention.

Next, in the case where at Step S310 the partial utterance information u is "电车的出发时间是几点" and then the processing returns to Step S303, example candidates E={电车几点钟出发, 电车几点钟到达, 电车为什么误点?} are obtained at Step 305 in the above-described manner, and the display areas 505 and 507 display at Step S306 the partial utterance information u and the example candidates E, respectively, as shown in FIG. 27A.

Figure 28A:
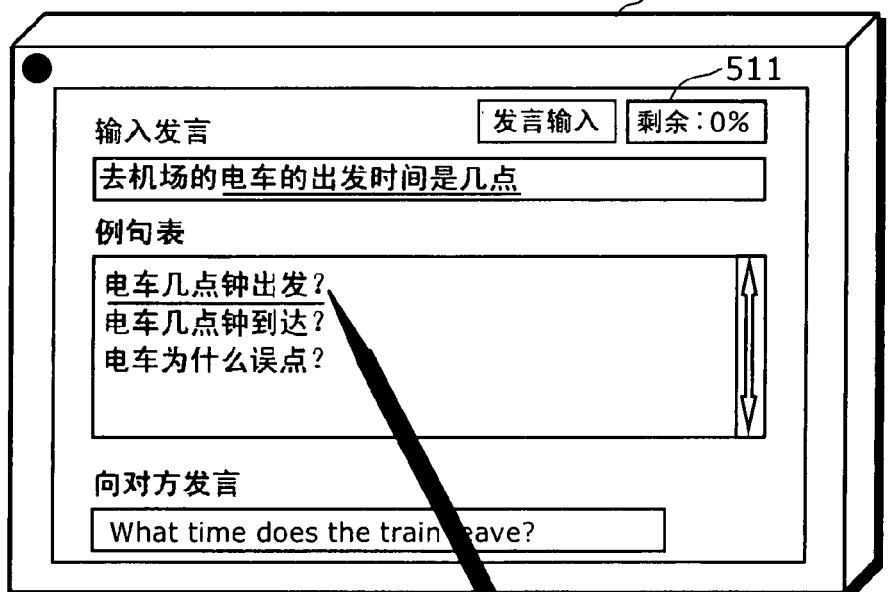
FIGS. 28A and 28B are diagrams showing display examples of the respective dialog supporting devices according to the present invention.
Figure 28B:
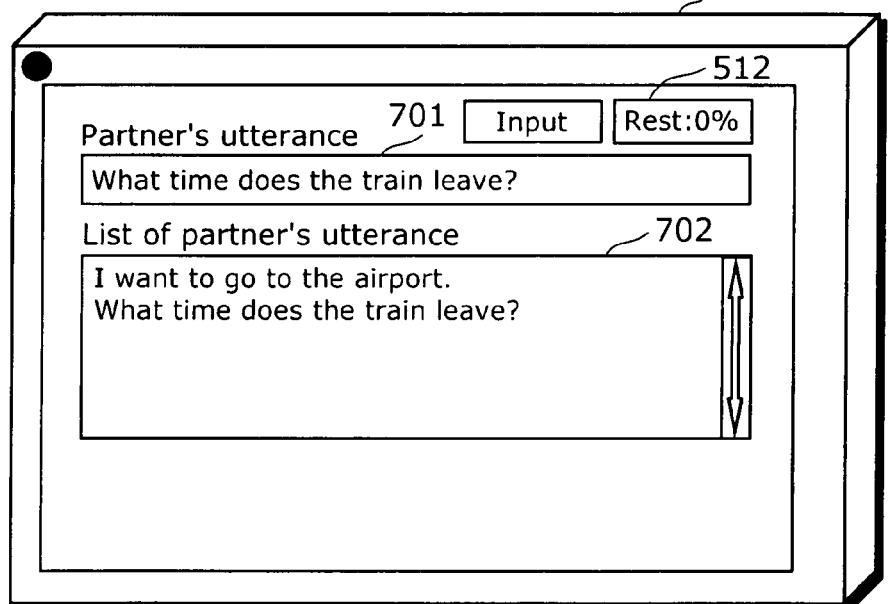

As shown in FIG. 28A, when the user 1 selects a desired example "电车几点钟出发?" in the same manner as descried above, a translated example "What time does the train leave?" is displayed on the display area 701 and 702 and also outputted as utterance from the PDA 502 as shown in FIG. 28B. At Step S308, the already-translated utterance information v is updated to "去机场的电车的出发时间是几点", and the partial utterance information u is updated to " ". These information are provided to the utterance difference calculating unit 105, and from these information the utterance difference calculating unit 105 calculates difference information (U−v)/U=(14−14)/14=0. The resulting difference information is displayed on the display area 511 and also on the display area 512. The user 2 can learn that the display area 702 displays all the user 1 wishes to say. Thus, it is possible to objectively judge to reply to the display area 702, so that the user 2 can reply to the user 1 with minimum utterances.

Figure 29A:
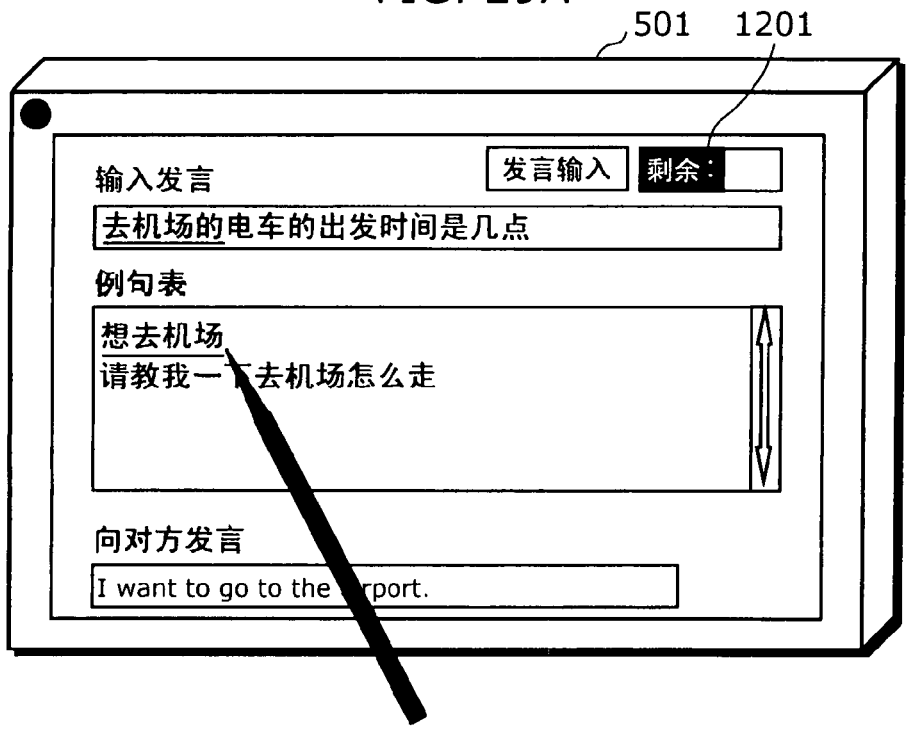
FIGS. 29A and 29B are diagrams showing display examples of the respective dialog supporting devices according to the present invention.
Figure 29B:
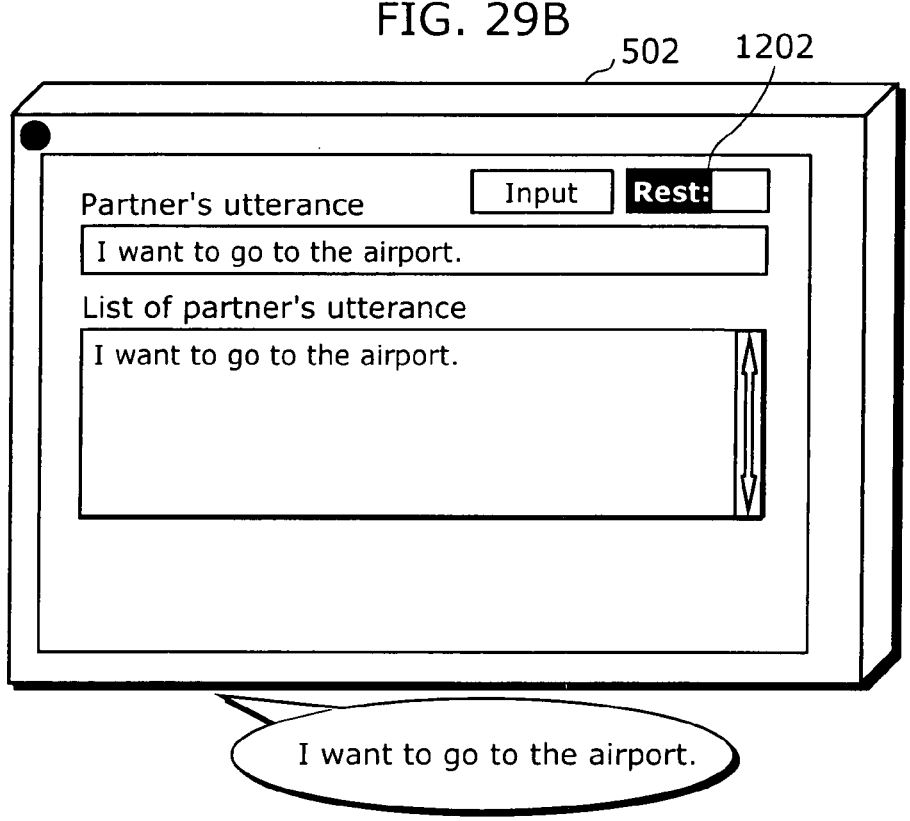
Figure 30A:
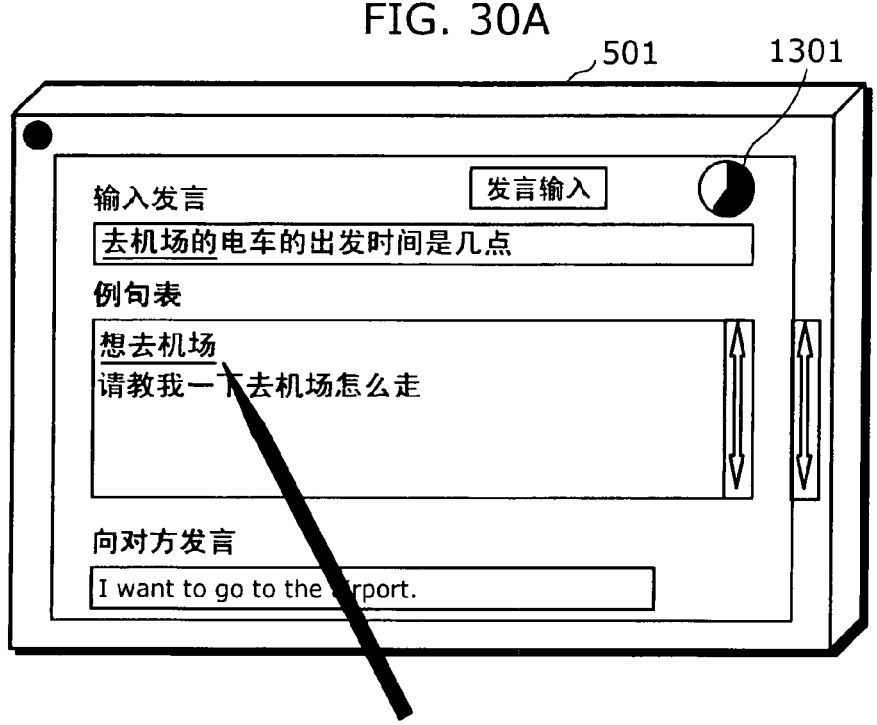
FIGS. 30A and 30B are diagrams showing display examples of the respective dialog supporting devices according to the present invention.
Figure 30B:
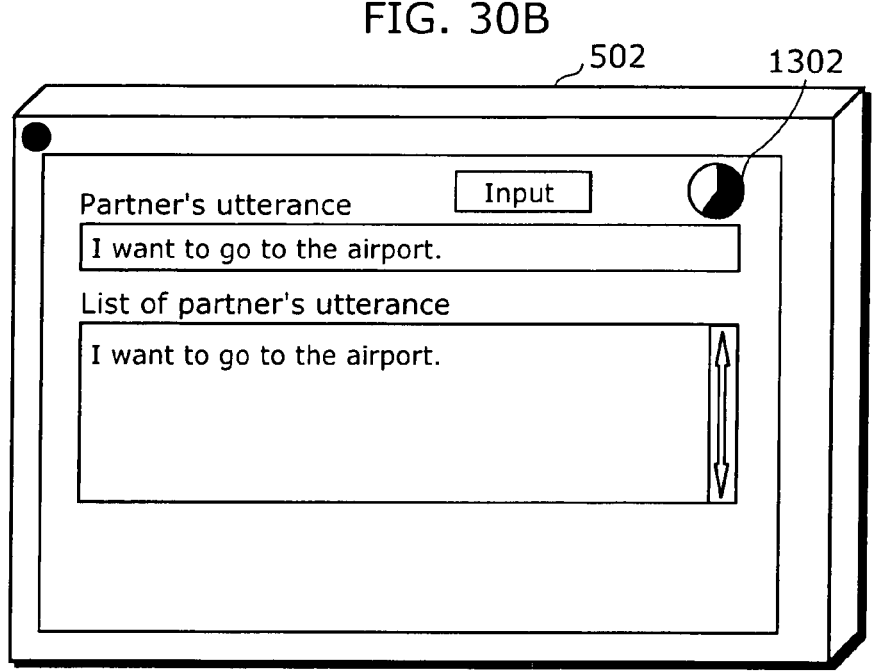
Figure 31A:
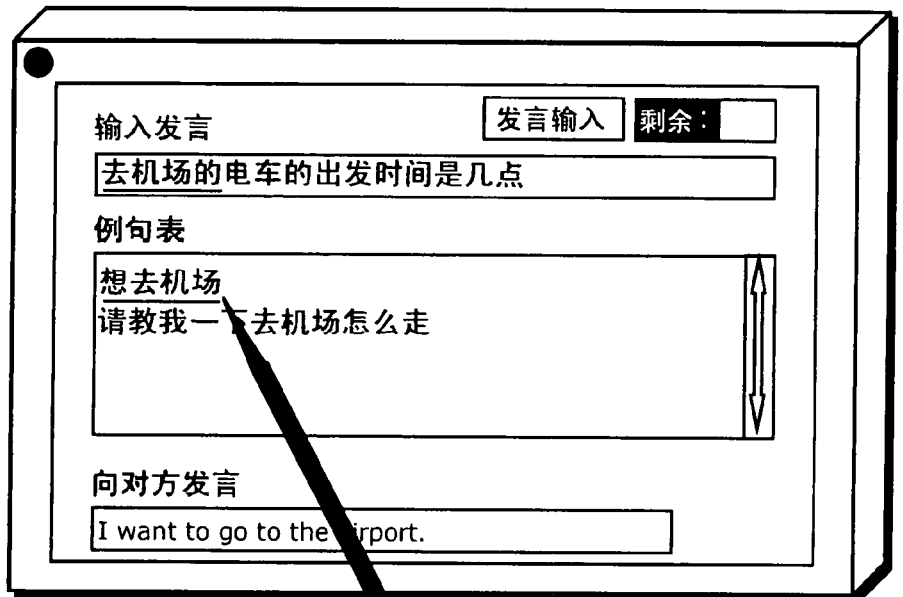
FIGS. 31A and 31B are diagrams showing display examples of the respective dialog supporting devices according to the present invention.
Figure 31B:
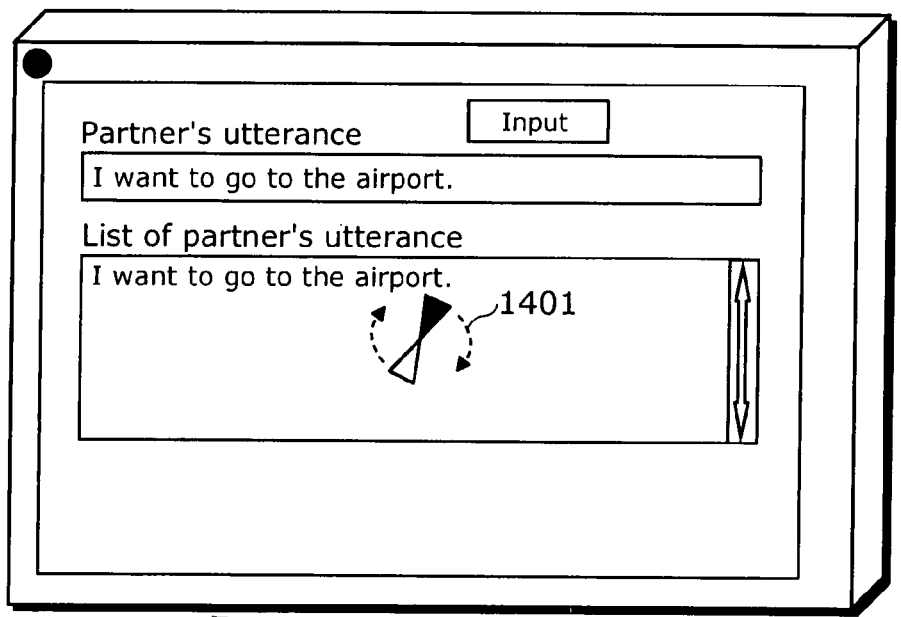

Note also that in the above description, the difference information is represented by a numeric value as one example, but the difference information may be expressed by a figure such as bars 1201 and 1202 as shown in FIGS. 29A and 29B or circle graphs 1301 and 1302 as shown in FIGS. 30A and 30B. Note also that the difference information may be used as a control parameter for controlling a metaphor expressing the difference information. For instance, the difference information may be expressed by a rotating sand clock 1401 as shown in FIG. 31B whose rotation speed is proportional to the difference information. As described above, by expressing the difference information as the figure or the metaphor, the user can easily learn the difference information, so that stress of the user waiting for the next utterance is reduced.

Figure 33A:
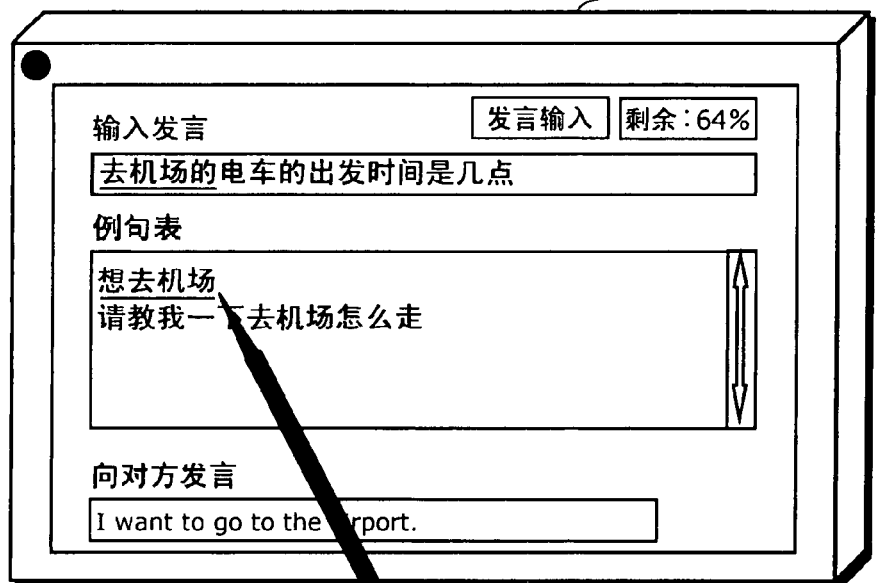
FIGS. 33A and 33B are diagrams showing display examples of the respective dialog supporting devices according to the present invention.
Figure 33B:
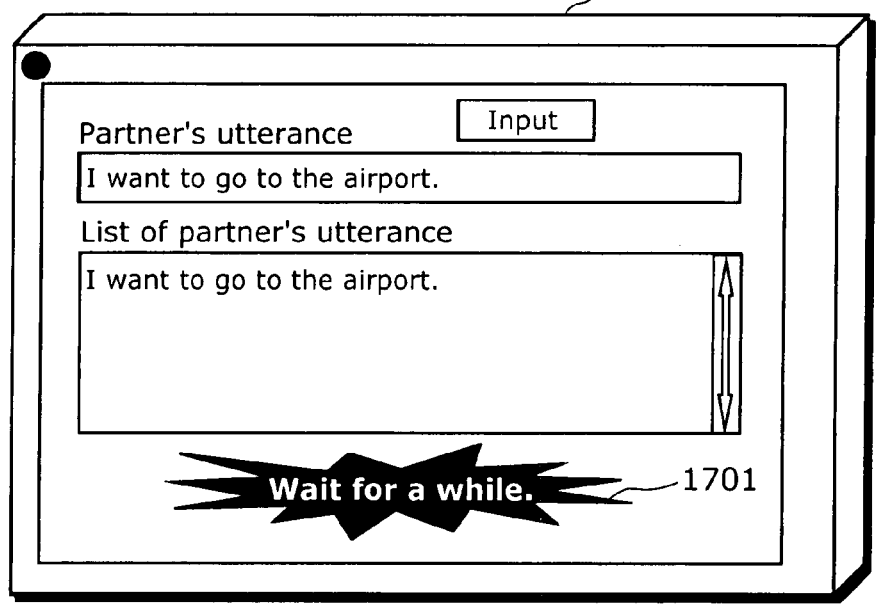

Note also that, as shown in FIG. 16, in addition to the structure of the dialog supporting device of FIG. 1, the dialog supporting device may have an expression conversion unit 1501 for presenting the user with the difference information by language expression. The expression conversion unit 1501 has conversion rules by which the difference information is converted to the language expression as shown in FIG. 32, for instance. When the difference information is 0.71 at the state of FIG. 26, according to the structure of FIG. 16, the difference information is converted to "Wait for a while." by conversion rule No. 2 of the expression converting unit 1501, and presented to the partner user as qualitative language expression 1701 as shown in FIG. 33B. As described above, by expressing the difference information as an appropriate language expression, stress of the user waiting for a next utterance is reduced.

Figure 27B:
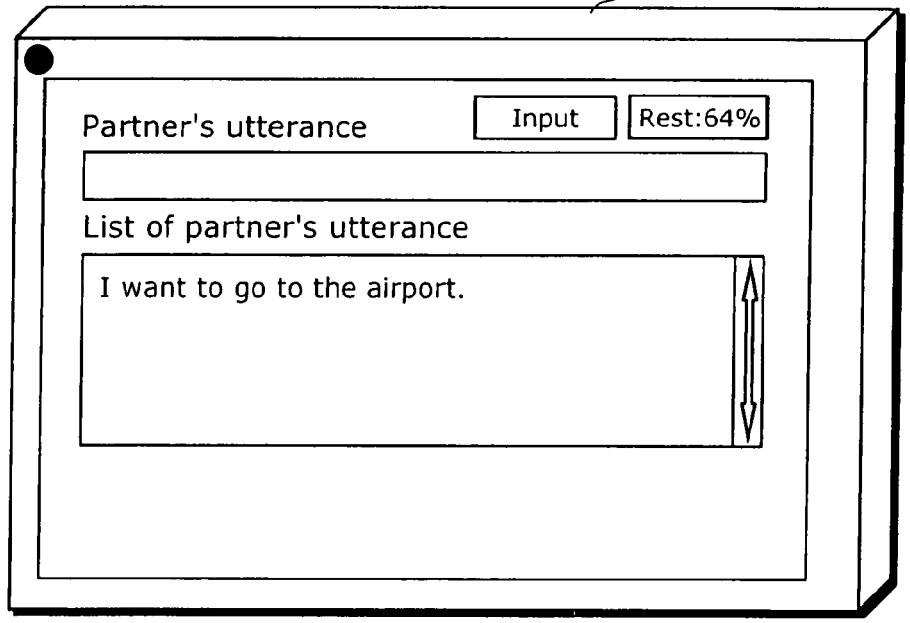
Figure 34A:
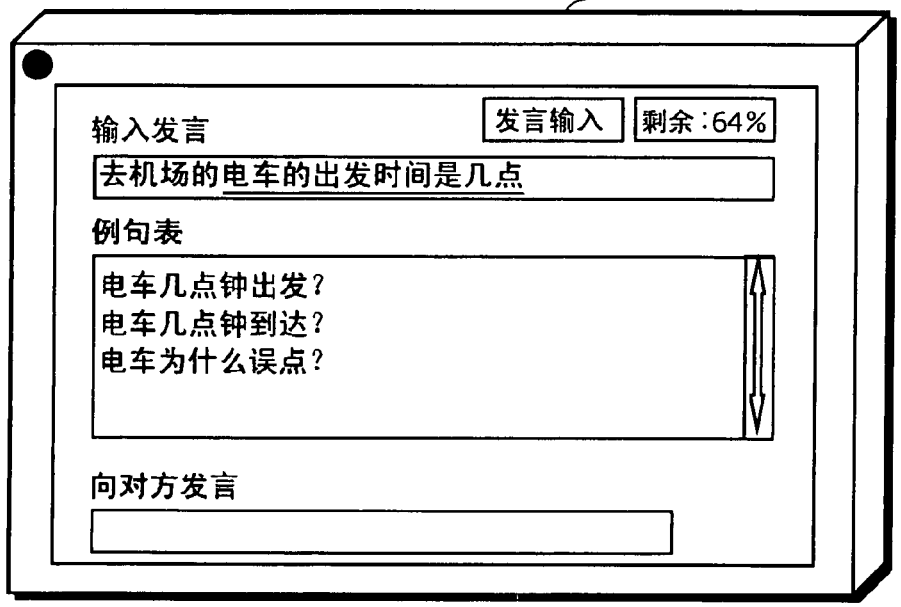
FIGS. 34A and 34B are diagrams showing display examples of the respective dialog supporting devices according to the present invention.
Figure 34B:
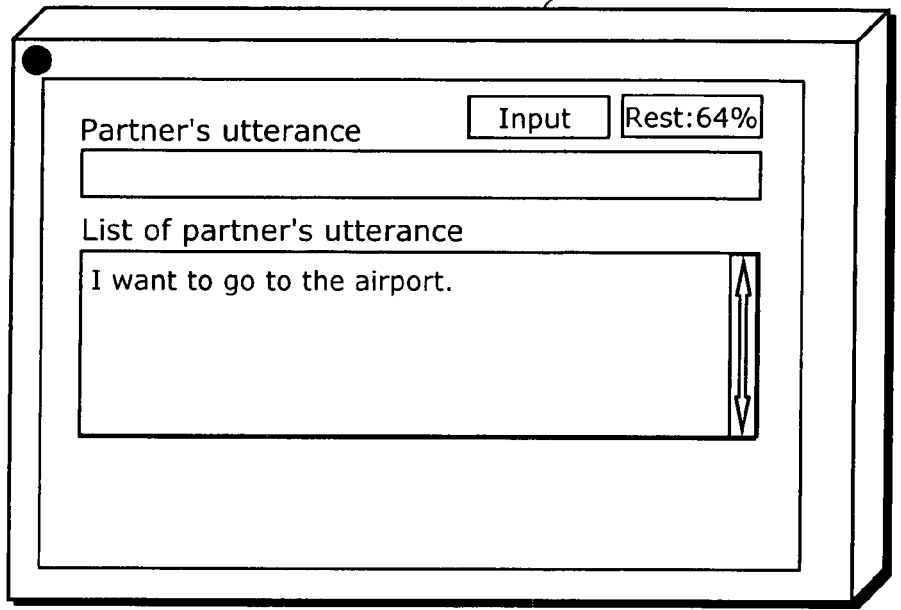

Note also that, as shown in FIG. 19, in addition to the structure of the dialog supporting device of FIG. 1, the dialog supporting device may have a filler database 1801. In this structure, when the difference information sent from the partner's dialog supporting device is not 0, the utterance outputting unit 107 may use the difference information as a control parameter for generating regularly or at random a sentence corresponding to a filler, such as "那个", "就是", or "And please wait," in the filler database 1801 and present the user with the generated sentence until the user's dialog supporting device receives a next example from the partner's dialog supporting device. In the structure of FIG. 19, at the state of FIG. 27, filler utterances are reproduced at random in the PDA 502 as shown in FIG. 34B. As described above, by acoustically filling a silent time with appropriate fillers until a next utterance is received, it is possible to reduce stress of the user waiting for the next utterance. Here, the displaying of the difference information on the display area 512 as shown in FIG. 34 is optional.

Fourth Embodiment

Figure 35:
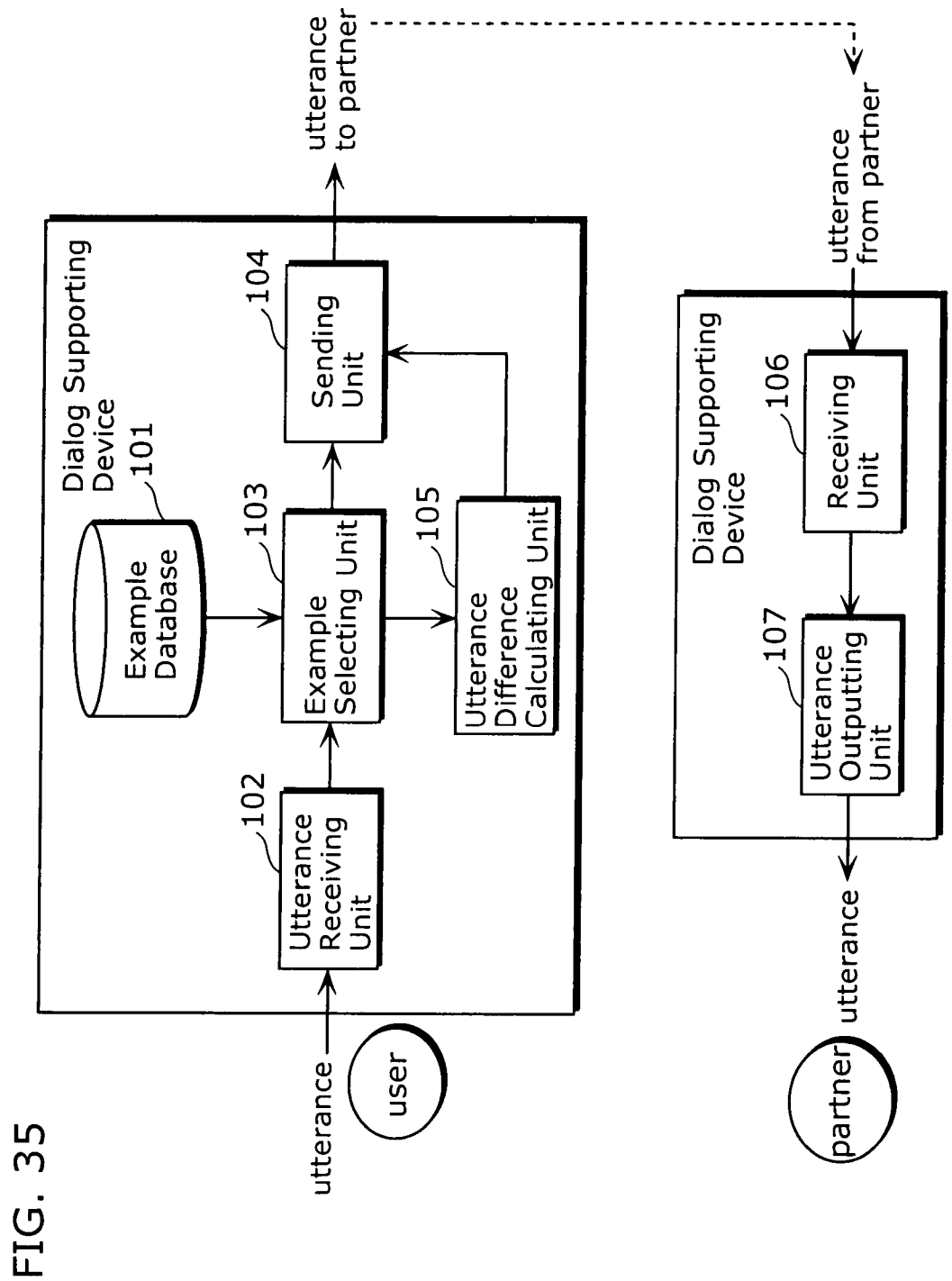
FIG. 35 is a block diagram showing a structure of a dialog supporting devices according to the still another embodiment of the present invention.

Note also that, as shown in FIG. 35, the dialog supporting device according to the first to third embodiment can be separated into (i) a sender which includes the example database 101, the utterance receiving unit 102, the example selecting unit 103, the sending unit 104, and the utterance difference calculating unit 105, and (ii) a receiver which includes the receiving unit 106 and the utterance outputting unit 107, as different independent structures.

Fifth Embodiment

Note also that, as shown in FIG. 36, the dialog supporting device according to the first to third embodiment can be realize a system having (i) a dialog supporting device which includes the utterance receiving unit 102, the sending unit 104, the receiving unit 106, and the utterance outputting unit 107, and (ii) a server which includes the example database 101, the example selecting unit 104, and the utterance difference calculating unit 105. Here, the dialog supporting device and the server are connected with each other via a network 2210 such as the Internet. In this system, the sending unit 104 of the dialog supporting device sends utterance information to the server, and the receiving unit 2201 of the server receives the utterance information. Then, the sending unit 2202 of the server sends (i) examples specified by the server based on the utterance information and (ii) difference information to the receiving unit 106 of the dialog supporting device. Note also that it is possible to firstly send (i) the examples specified by the server based on the utterance information and (ii) the difference information, to the user's dialog supporting device, and then send these information from the user's dialog supporting device to the partner's dialog supporting device.

Note also that the present embodiments have been described, as one example, the cases of dialog between Japanese and English, and dialog between Chinese and English, but the present invention can be applied to dialog in any other languages and does not depend on specific languages.

Although only the exemplary embodiments of the present invention have been described in detail above, those skilled in the art will be readily appreciate that many modifications are possible in the exemplary embodiments without materially departing from the novel teachings and advantages of the present invention. Accordingly, all such modifications are intended to be included within the scope of this invention.

The dialog supporting device according to the present invention has a function of speedily completing utterances of dialog participants, and is suitable for a translation application software and the like used in a mobile telephone, a mobile terminal, and the like. Further, the present invention can be applied to a public street terminal, a public guide terminal, and the like. Furthermore, if the present invention is used for dialog between the same language, the present invention is also applied to a chatting system using fixed sentences.

What is claimed is:

1. A dialog supporting device which supports dialog, said device comprising:
    an example database configured to store a first plurality of examples and a second plurality of examples which are used in dialog, respective first plurality of examples being associated with respective second plurality of examples;
    an utterance receiving unit configured to receive an utterance of a user;
    an example selecting unit configured to (i) select a first example from the first plurality of examples by searching said example database based on the utterance received by said utterance receiving unit, and (ii) select a second example from the second plurality of examples associated with the selected first example;
    an utterance difference calculating unit configured to (i) calculate a difference between the utterance and the first example selected by said example selecting unit, and (ii) obtain difference information representing the calculated difference, the difference information being related to a portion of dialog which is included in the utterance but not included in or corresponding to the first example; and
    a sending unit configured to send the second example obtained by said example selecting unit and the difference information obtained by said utterance difference calculating unit, to a dialog supporting device of a dialog partner of the user.

2. The dialog supporting device according to claim 1, wherein said example selecting unit is further configured to select another first example related to the utterance, based on the difference between the utterance and the selected first example.

3. The dialog supporting device according to claim 1, wherein said example selecting unit is configured to calculate similarity which represents a degree of similarity between the utterance and the selected first example, using dynamic programming in a unit of any one of a character, a word, and a letter indicating pronunciation.

4. The dialog supporting device according to claim 1, wherein said utterance difference calculating unit is configured to calculate the difference, by comparing the utterance and the first example selected by said example selecting unit in a unit of any one of a character, a word, and a letter indicating pronunciation.

5. The dialog supporting device according to claim 1, further comprising:
    a receiving unit configured to receive a second example and difference information sent from the dialog supporting device of the partner user; and
    an utterance outputting unit configured to output the second example and the difference information received by said receiving unit.

6. The dialog supporting device according to claim 5, wherein said utterance outputting unit is configured to display the difference information received by said receiving unit, by a numeric character.

7. The dialog supporting device according to claim 5, wherein said utterance outputting unit is configured to display the difference information received by said receiving unit, by a figure.

8. The dialog supporting device according to claim 5, wherein said utterance outputting unit is configured to convert the difference information received by said receiving unit, into qualitative language expression, and output the resulting language expression.

9. The dialog supporting device according to claim 5, wherein said utterance outputting unit is configured to generate language expression corresponding to a filler based on the difference information received by said receiving unit, and output the resulting language expression.

10. The dialog supporting device according to claim 1, further comprising:
    a candidate notifying unit configured to notify the user of a plurality of candidates for the first example selected by said example selecting unit; and
    a selection instruction receiving unit configured to receive an instruction from the user to select a candidate from the plurality of candidates for the first example,
    wherein said example selecting unit is configured to (i) extract the candidate for the first example from the example database based on the utterance, and (ii) select the first example from the plurality of candidates according to the instruction received by said selection instruction receiving unit.

11. The dialog supporting device according to claim 1, wherein said utterance receiving unit is configured to receive the utterance (i) via continuous utterance recognition processing using a language model derived from the first example held in said example database, or (ii) via a keyboard under limitation by which only words included in the first examples held in said example database can be inputted.

12. A dialog supporting system comprising a first dialog supporting device and a second dialog supporting device, said dialog supporting system supporting dialog using said first and second dialog supporting devices, wherein said first dialog supporting device includes:

an example database configured to store a first plurality of examples and a second plurality of examples which are used in the dialog, respective first plurality of examples being associated with respective second plurality of examples;

an utterance receiving unit configured to receive an utterance of a user;

an example selecting unit configured to (i) select a first example from the first plurality of examples by searching said example database based on the utterance received by said utterance receiving unit, and (ii) select a second example from the second plurality of examples associated with the selected first example;

an utterance difference calculating unit configured to (i) calculate a difference between the utterance and the first example selected by said example selecting unit, and (ii) obtain difference information representing the calculated difference, the difference information being related to a portion of dialog which is included in the utterance but not included in or corresponding to the first example; and a sending unit configured to send the second example obtained by said example selecting unit and the difference information obtained by said utterance difference calculating unit, to said second dialog supporting device, and said second dialog supporting device includes:

a receiving unit configured to receive the second example and the difference information sent from said first dialog supporting device; and an utterance outputting unit configured to output the second example and the difference information received by said receiving unit.

13. A dialog supporting system comprising a first dialog supporting device, a second dialog supporting device, and a server connecting the first and second dialog supporting devices, said dialog supporting system supporting dialog using said first and second dialog supporting devices, wherein said first dialog supporting device includes:

an utterance receiving unit configured to receive an utterance of a user; and a sending unit configured to send the utterance received by said utterance receiving unit to said server, and said server including:

an example database configured to store a first plurality of examples and a second plurality of examples which are used in the dialog, respective first plurality of examples being associated with respective second plurality of examples;

an example selecting unit configured to (i) select a first example from the first plurality of examples by searching said example database based on the utterance sent from said first dialog supporting device, and (ii) select a second example from the second plurality of examples associated with the selected first example;

an utterance difference calculating unit configured to (i) calculate a difference between the utterance and the first example selected by said example selecting unit, and (ii) obtain difference information representing the calculated difference, the difference information being related to a portion of dialog which is included in the utterance but not included in or corresponding to the first example; and a sending unit configured to send the second example obtained by said example selecting unit and the difference information obtained by said utterance difference calculating unit, to said second dialog supporting device, and said second dialog supporting device includes:

a receiving unit configured to receive the second example and the difference information from said server; and an utterance outputting unit configured to output the second example and the difference information received by said receiving unit.

14. A dialog supporting method of supporting dialog, said method comprising:

receiving an utterance of a user;

selecting a first example by searching an example database based on the utterance received in said receiving, and selecting a second example associated with the selected first example, the example database storing a first plurality of examples and a second plurality of examples which are used in the dialog, respective first plurality of examples being associated with respective second plurality of examples;

calculating a difference between the utterance and the first example selected in said selecting, and obtaining difference information representing the calculated difference, the difference information being related to a portion of dialog which is included in the utterance but not included in or corresponding to the first example; and sending the second example obtained in said selecting and the difference information obtained in said calculating, to a dialog supporting device of a dialog partner.

15. A computer program product which, includes a program stored on a computer-readable medium such that when loaded into a computer, supports dialog and allows the computer to execute a method comprising:

receiving an utterance of a user;

selecting a first example by searching an example database based on the utterance received in said receiving, and obtaining a second example associated with the selected first example, the example database storing a first plurality of examples and a second plurality of examples which are used in the dialog, respective first plurality of examples being associated with respective second plurality of examples;

calculating a difference between the utterance and the first example selected in said selecting, and obtaining difference information representing the calculated difference, the difference information being related to a portion of dialog which is included in the utterance but not included in or corresponding to the first example; and sending the second example obtained in said selecting and the difference information obtained in said calculating, to a dialog supporting device of a dialog partner.

* * * * *